(12) United States Patent
Vasquez et al.

(10) Patent No.: US 9,958,854 B2
(45) Date of Patent: May 1, 2018

(54) SYSTEMS AND METHODS FOR ROBOTIC MEASUREMENT OF PARTS

(71) Applicant: The Boeing Company, Chicago, IL (US)

(72) Inventors: Christina M. Vasquez, Snohomish, WA (US); Theodore M. Boyl-Davis, Snohomish, WA (US); Dario I. Valenzuela, Snohomish, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 383 days.

(21) Appl. No.: 14/265,212

(22) Filed: Apr. 29, 2014

(65) Prior Publication Data

US 2014/0365061 A1    Dec. 11, 2014

Related U.S. Application Data

(60) Provisional application No. 61/833,280, filed on Jun. 10, 2013.

(51) Int. Cl.
| | | |
|---|---|---|
| *G05B 19/402* | (2006.01) | |
| *G05D 1/02* | (2006.01) | |
| *G05B 19/401* | (2006.01) | |

(52) U.S. Cl.
CPC ......... *G05B 19/402* (2013.01); *G05B 19/401* (2013.01); *G05D 1/021* (2013.01); *G05B 2219/40298* (2013.01); *Y10S 901/44* (2013.01)

(58) Field of Classification Search
CPC ................ G05B 19/401; G05B 19/402; G05B 2219/40298; G05D 1/021

(Continued)

(56) References Cited

U.S. PATENT DOCUMENTS

| 4,512,837 A | 4/1985 | Sarh et al. |
| 5,828,566 A | 10/1998 | Pryor |

(Continued)

FOREIGN PATENT DOCUMENTS

| DE | 102010032467 | 2/2012 |
| EP | 0976472 A2 | 2/2000 |

(Continued)

OTHER PUBLICATIONS

International Search Report and Written Opinion for counterpart PCT/US2014/038088.

*Primary Examiner* — Aaron L Troost
(74) *Attorney, Agent, or Firm* — Joseph M. Butscher; The Small Patent Law Group, LLC

(57) ABSTRACT

Systems and methods for robotic measurement of parts are provided. One system includes one or more omni-directional ground vehicles configured to move within a facility defined work zone to a setup calibration station and an engineering defined work space, wherein the engineering defined work space includes a part to be measured. The system also includes a multi-axis robot removably coupled to each of the omni-direction ground vehicles and configured to move a laser scanner, wherein the laser scanner of each of the multi-axis robots is configured to move in at least two linear directions and one rotational direction. The system further includes a processor configured to automatically generate a surface ready output file from measurement data received from the laser scanners, wherein the surface ready output file is configured to command a machine to manufacture a mating component to the part.

20 Claims, 25 Drawing Sheets

(58) Field of Classification Search
USPC .................................... 248/646, 647; 701/23
See application file for complete search history.

(56) References Cited

U.S. PATENT DOCUMENTS

| | | | |
|---|---|---|---|
| 6,237,210 B1 | 5/2001 | Stoewer et al. | |
| 6,505,393 B2 | 1/2003 | Stoewer et al. | |
| 6,633,800 B1* | 10/2003 | Ward | B60W 50/02 |
| | | | 180/167 |
| 6,877,203 B2 | 4/2005 | Engstrom et al. | |
| 8,185,238 B2 | 5/2012 | Gonzalez Sainz et al. | |
| 8,634,950 B2 | 1/2014 | Simonet et al. | |
| 2003/0046801 A1 | 3/2003 | Engstrom et al. | |
| 2003/0090489 A1* | 5/2003 | Watanabe | B25J 9/1671 |
| | | | 345/473 |
| 2005/0150123 A1 | 7/2005 | Eaton | |
| 2005/0166413 A1* | 8/2005 | Crampton | B25J 13/088 |
| | | | 33/503 |
| 2007/0063500 A1 | 3/2007 | Eaton | |
| 2007/0071310 A1* | 3/2007 | Kobayashi | B25J 9/1666 |
| | | | 382/153 |
| 2007/0142973 A1* | 6/2007 | Takizawa | B25J 9/1671 |
| | | | 700/259 |
| 2008/0235970 A1 | 10/2008 | Crampton | |
| 2009/0076655 A1* | 3/2009 | Blondel | B25J 9/1692 |
| | | | 700/254 |
| 2010/0066676 A1 | 3/2010 | Kramer et al. | |
| 2010/0143089 A1* | 6/2010 | Hvass | G05D 1/027 |
| | | | 414/754 |
| 2010/0192377 A1* | 8/2010 | Stephan | B64C 1/068 |
| | | | 29/897.2 |
| 2010/0224427 A1* | 9/2010 | Nuchter | B25J 5/007 |
| | | | 180/7.1 |
| 2010/0304039 A1 | 12/2010 | Bausen | |
| 2011/0282483 A1* | 11/2011 | Simonetti | G05B 19/402 |
| | | | 700/114 |
| 2013/0123983 A1* | 5/2013 | Brog Rdh | B25J 9/162 |
| | | | 700/254 |
| 2013/0226340 A1* | 8/2013 | Buchstab | B25J 5/04 |
| | | | 700/245 |
| 2014/0350725 A1* | 11/2014 | Lafary | G06N 3/008 |
| | | | 700/253 |

FOREIGN PATENT DOCUMENTS

| | | | | |
|---|---|---|---|---|
| EP | 2068067 A1 * | 6/2009 | | F16M 11/42 |
| EP | 2533167 | 12/2012 | | |
| WO | WO 2009/086495 | 7/2009 | | |

* cited by examiner

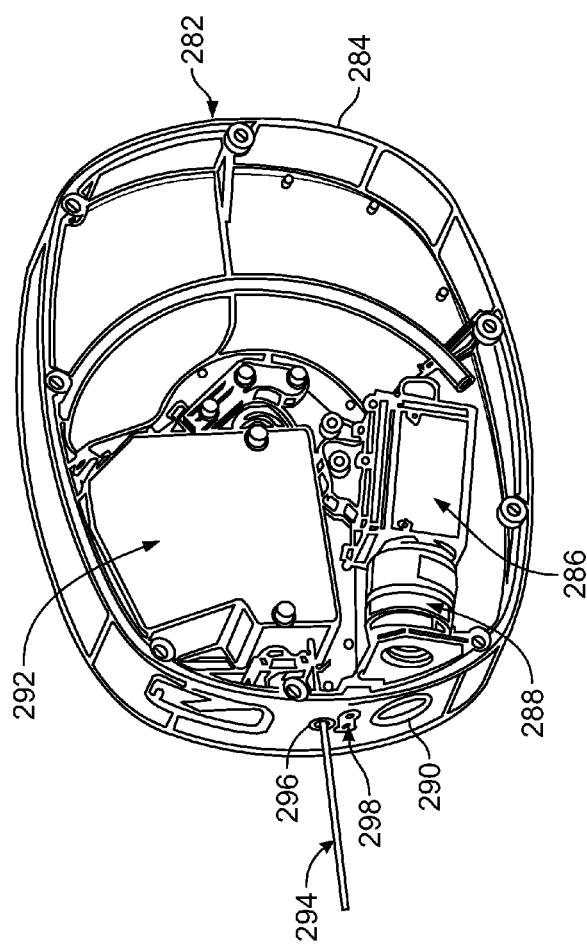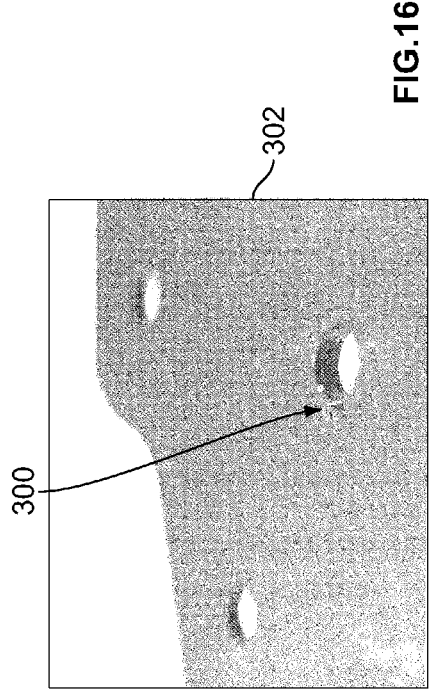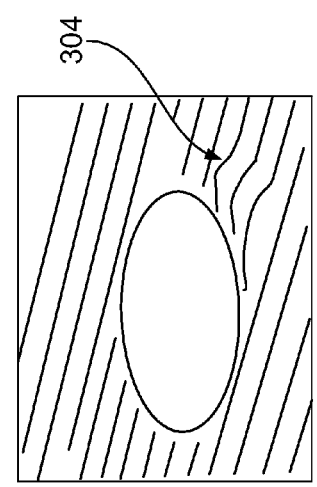
FIG.16

SYSTEMS AND METHODS FOR ROBOTIC MEASUREMENT OF PARTS

CROSS-REFERENCE TO RELATED APPLICATIONS

This application claims priority to and the benefit of the filing date of U.S. Provisional Application No. 61/833,280, filed Jun. 10, 2013 entitled "Systems and Method for Robotic Measurement of Parts," which is hereby incorporated by reference in its entirety.

BACKGROUND

The present disclosure relates generally to robotic systems, and more particularly, to systems and methods for controlling robotic systems for measuring parts to allow manufacturing mating parts based on the measurements.

Robots may be utilized to measure, manufacture, position and assemble parts in spaces that are awkward or may be difficult to reach with a human arm, or that may not be visible with the human eye. For example, a robot may be used for custom fitting of parts to an aircraft wing, such as fitting of riblets, pillars, pivots, etc. that may fit inside the base of the wing to provide stability.

Automated processes that use robots can reduce the tooling used, as well as reduce the potential for human error. Additionally, these automated processes can increase productivity and allow greater flexibility for the task performed. For example, in an aircraft application, an automated process using robots may use data that enable improved installation within confined spaces (e.g., within the aircraft wing).

Conventional processes for automated manufacturing and assembly result in parts to be fit into, for example, composite wing boxes that have surface contours that are not well controlled by the fabrication process. Accordingly, shims are used to account for manufacturing tolerances. However, a mechanic typically enters a confined space, which makes it difficult to obtain accurate measurements, which can lead to less than optimal measurements, shimming and/or installation. Moreover, in some aircraft designs, entry into confined spaces may be limited or prohibited, such as wing boxes and similar aircraft spaces.

SUMMARY

In accordance with one embodiment, a robot measurement system is provided that includes a first multi-axis robot having a measurement sensor, wherein the first multi-axis robot is configured to allow movement of the measurement sensor along an x-axis and a z-axis, with the x-axis being movement horizontally and the z-axis axis being movement vertically. The first multi-axis robot is further configured to allow rotation of the measurement sensor about an axis parallel to the x-axis. The robot measurement system also includes a second multi-axis robot having a measurement sensor, wherein the second multi-axis robot is configured to allow movement of the measurement sensor along the x-axis, a y-axis and the z-axis, with the y-axis movement perpendicular to the x-axis horizontal movement and the z-axis vertical movement. The second multi-axis robot is further configured to allow rotation of the measurement sensor about an axis parallel to the x-axis and an axis parallel to the z-axis. The robot measurement system further includes an omni-directional ground vehicle coupled to each of the first and second multi-axis robots and configured to autonomously move the first and second multi-axis robots in a facility defined work zone to at least one of a setup calibration station or an engineering defined work space having a part to be measured, wherein the setup calibration station or engineering defined work space is within the facility defined work space.

In accordance with another embodiment, a method for measuring an aircraft part is provided. The method includes controlling a one or more omni-directional ground vehicles to move within a facility defined work zone to a setup calibration station and an engineering defined work space, wherein the engineering defined work space includes an aircraft part to be measured. The method also includes controlling a multi-axis robot removably coupled to each of the omni-direction ground vehicles to move a laser scanner when the laser scanner is positioned at the setup calibration station or the engineering defined work space, wherein the laser scanner of each of the multi-axis robots is configured to move in at least two linear directions and one rotational direction. The method further includes automatically generating a surface ready output file from measurement data received from the laser scanners, wherein the surface ready output file configured to command a machine to manufacture a mating component to the part.

In accordance with yet another embodiment, an integrated robot measurement system is provided that includes a facility defined work zone comprising a physical area within a facility and one or more omni-directional ground vehicles configured to move within the facility defined work zone to a setup calibration station and an engineering defined work space, wherein the one or more omni-directional ground vehicles are each configured to support a portion of a structure thereon. The integrated robot measurement system also includes a multi-axis robot removably coupled to each of the omni-direction ground vehicles and configured to move a laser scanner when the laser scanner is positioned at the setup calibration station or the engineering defined work space, wherein the laser scanner of each of the multi-axis robots is configured to move in at least two linear directions and one rotational direction. The integrated robot measurement system further includes a processor configured to automatically generate a surface ready output file from measurement data received from the laser scanners to define coordinate systems for the movement of the one or more omni-directional ground vehicles, the surface ready output file configured to command the one or more omni-directional ground vehicles to move into position for joining the portions of the structures.

The features and functions discussed herein can be achieved independently in various embodiments or may be combined in yet other embodiments, further details of which can be seen with reference to the following description and drawings.

BRIEF DESCRIPTION OF THE DRAWINGS

FIG. 16 is an illustration of a camera in accordance with an embodiment.

DETAILED DESCRIPTION

Figure 1:
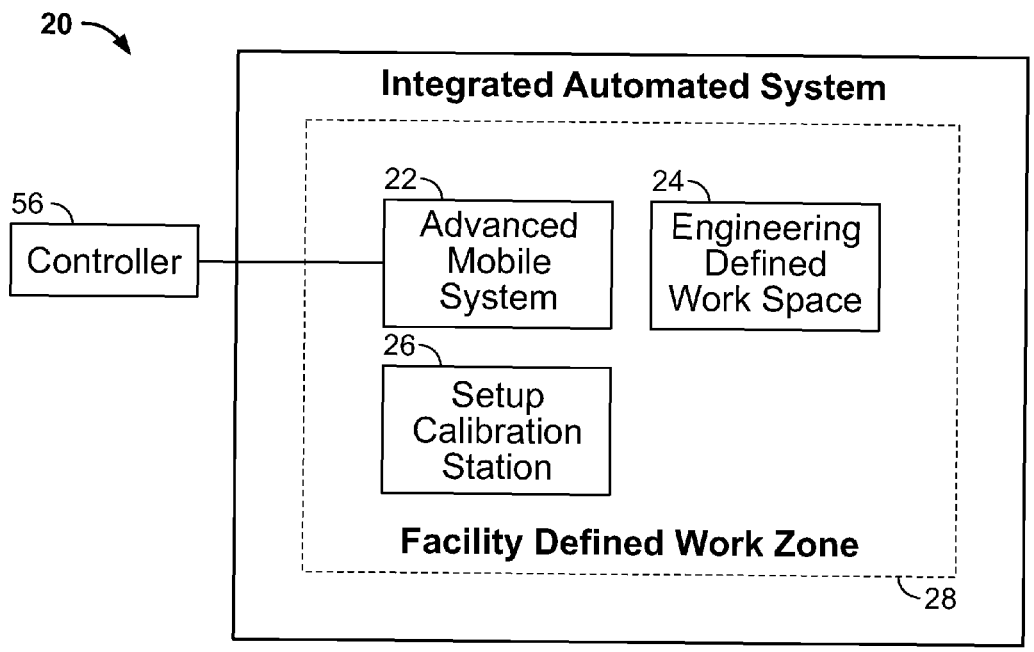
FIG. 1 is a block illustration of an automated system in accordance with one embodiment.

The following detailed description of certain embodiments will be better understood when read in conjunction with the appended drawings. It should be understood that the various embodiments are not limited to the arrangements and instrumentality shown in the drawings.

As used herein, the terms "module", "system," or "unit," may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described and/or illustrated herein provide methods and systems for automated measurement of surfaces, such as surfaces located in confined spaces to acquire data to be used, for example, in manufacturing or assembling of various parts that may include one or more fillers (e.g., shims). For example, some embodiments provide automated and/or autonomous (with little or no human interaction) measurement of these surfaces without the entry of an operator (e.g., a mechanic) into the part to be measured, resulting in more accurate custom part production, which may be installed without shims or with fillers defined by the automated measurement process. It should be appreciated that although an aircraft application is described herein, the various embodiments are not limited to aircraft applications, but the methods and systems described herein may be used in non-aircraft applications. For example, the various embodiments may be used in various land, air, sea and space applications.

In general, various embodiments may include scanning two mating parts to determine an "as built" condition of the structure (e.g., surface anomalies, profiles, hole locations, etc.). In various embodiments, the independent scan data of the two surfaces is aligned electronically and that may be sued to define a filler, such as a shim. For example, alignment of datasets corresponding to mating parts is performed for defining shims to be placed at specific places therebetween. The shim then may be machined (e.g., CNC machining) based on a filler definition automatically determined from the measurements.

In various embodiments, an integrated automated system 20 may be provided as illustrated in FIG. 1. The system 20 in some embodiments allows robotic measurements to facilitate developing custom engineering defined aircraft parts (e.g., aircraft stabilizers or wing parts). For example, in some embodiments, the system 20 is configured as an integrated robotic measurement system that enables custom part production. The custom parts in various embodiments may be installed without shimming or with automatically defined fillers, and in some embodiments, also may be performed robotically. The system 20 is operable to enable automated or autonomous remote, robotic measurements of composite surfaces (e.g., aircraft wing or wing box) in situ, for example, for use with custom part production, which enables the manufacture of custom-built parts for installation on an aircraft. The system 20 allows operation in confined spaces that exceed space constraints, such as for a mechanic.

In one embodiment, the system 20 includes an advanced mobile system 22 (which may include one or more robots or omni-directional ground vehicles), an engineering defined work space 24 and a setup calibration station 26, which in the illustrated embodiment are all within a facility defined work zone 28. In various embodiments, the advanced mobile system 22 is operable to move one or more scanners (e.g., laser measurement scanners) within the facility defined work zone 28, as well as into the setup calibration station 26 and the engineering defined work space 24, such as within an aircraft wing or wing box. In these embodiments, individuals, such as mechanics, may enter the facility defined work space 28, but not the engineering defined work space 24, which includes supported therein a particular part, such as an aircraft wing. For example, a part to be measured (e.g., within 1000ths of an inch) is maintained within the engineering defined work space 24 to identify a region in which individuals should not enter to prevent contact and movement of the part therein.

In operation, the system 20 allows integrated measurement operations that are automated or autonomous. For example, the system 20 is operable to provide robotic navigation to a wing box, use of an onboard laser scanner for measuring the part, onboard data processing including processing of measurements to determine dimensions for a part to be built or manufactured, as well as formatting the dimensions for input for fabrication of the part. For example, the measurements may be used as an input to a computer-aided design, a computer-aided engineering, and/or a computer-aided manufacturing (CAD/CAE/CAM) environment, such as implemented using CATIA™, available from Dassault Systemes S.A., of France.

Figure 2:
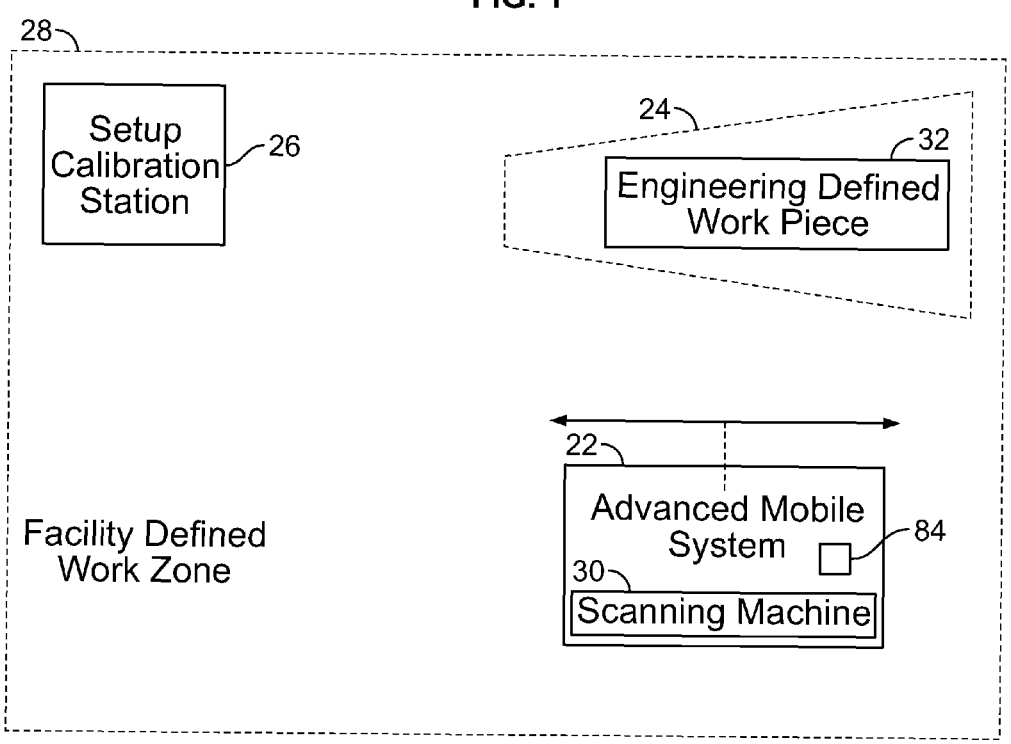
FIG. 2 is another block illustration of an automated system in accordance with one embodiment.

Thus, for example, the facility defined work space 28 may define an outer physical boundary within which operations of various embodiments may be performed as shown in FIG. 2. For example, the advanced mobile system 22 may be configured to support thereon and move a scanner, illustrated as a scanning machine 30 (that includes one or more measurement sensors) within the facility defined work space 28. In some embodiments, the advanced mobile system 22 provides movement of the scanning machine 30, such as to the setup calibration station 26 to calibrate the scanning machine 30 before and/or after movement to the engineering defined work space 24 to perform measurements on an engineering defined work piece 32 (e.g., aircraft wing) contained within the engineering defined work space 24. It should be noted that a portion of the engineering defined work piece 32 may extend outside of the engineering defined work space 24 in some embodiments. Thus, the facility defined work zone 24 is the area, such as physical space within a facility (e.g., warehouse) wherein the advanced mobile system 22, setup calibration station 26 and engineering defined work space 24 are located. It should be noted that different support structures may be provided, such as a horizontal stabilizer assembly as described in more detail herein. Additionally, the setup calibration station 26 is used in combination with the advanced mobile system 22 for verification of accuracy of the components that are part of the advanced mobile system 22, such as the measurement scanner or sensor thereon.

As used herein, the engineering defined work piece 32 is an object to be analyzed, such as an aircraft wing. In operation, the advanced mobile system 22 is operated or maneuvered to position the scanner or scanner at one or more locations within or in relation to the engineering defined work zone 24 to analyze the engineering defined work piece 32, for example, to measure an outer or inner contour or surface of the aircraft wing.

In various embodiments, the advanced mobile system 22 is configured to move the scanning machine 30 and allow wide viewing range, for example, 270 degree viewing range with data collection, such as within the engineering defined work piece 32. In one embodiment, the advanced mobile system 22 integrates an omni-directional vehicle that supports thereon a multi-axis machine with a laser sensor (embodied as the scanning machine 30 in various embodiments) on top of the multi-axis machine as described in more detail herein. The scanning machine 30, in some embodiments, is a multi-axis machine that allows movement in and/or about multiple different axes, and having a displacement laser attached for performing measurements as described herein.

Figure 3:
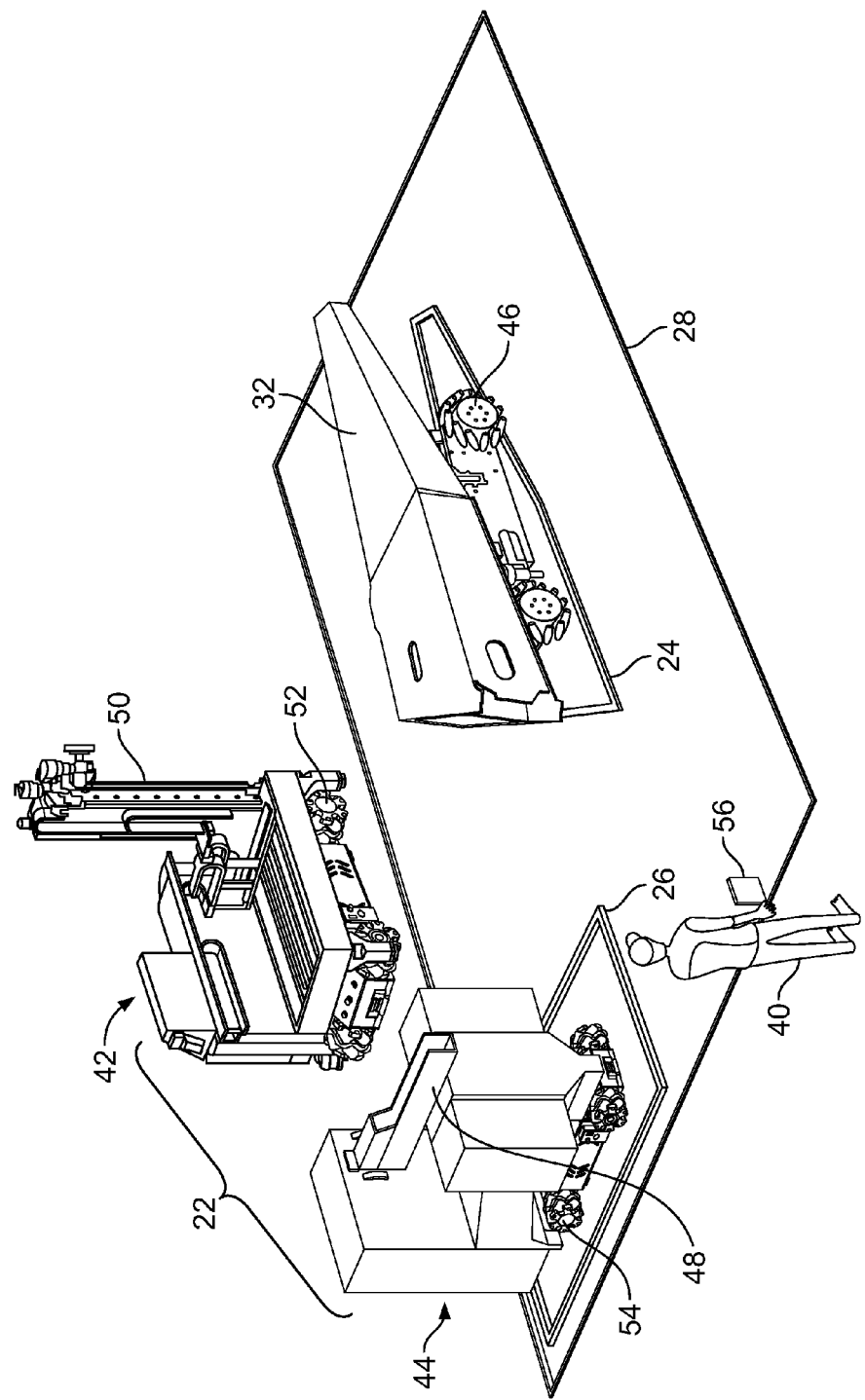
FIG. 3 is a perspective view of an exemplary configuration of an automated system in accordance with one embodiment.

FIG. 3 is a perspective view of one embodiment of the system 20. As can be seen, an individual 40 is located outside the facility defined work zone 28, but may enter the facility defined work zone 28, but not within the engineering defined work zone 24. For example, in the illustrated embodiment, a scanner 44 is within the setup calibration station 26 being calibrated, which will be described in more detail herein. The individual 40 may enter the facility defined work zone 28 to control movement (e.g., manually or electronically) of the scanner 44 in order to perform calibrations thereof or some or all of the movements may be performed automatically or autonomously.

In the illustrated embodiment, the advanced mobile system 22 includes two scanners, namely a scanner 42 and the scanner 44. However, it should be noted that fewer or additional scanners may be provided as desired or needed, for example, to measure the engineering defined work piece 32, which in this embodiment is an aircraft wing. The two scanners 42 and 44 in this embodiment may be used to perform different measurements of the engineering defined work piece 32, which measurement operations may be performed at the same (e.g., simultaneously or concurrently) or different times. In one embodiment, the scanner 42 includes a scanning device (e.g., laser measurement device) that is configured to translate vertically and perform external measurements of the engineering defined work piece 32. Additionally, in this embodiment, the scanner 44 includes a scanning device that is configured to translate horizontally and perform internal measurements of the engineering defined work piece 32, such as moving into the interior of the engineering defined work piece 32. For example, a support 48 of the scanner 44, illustrated as a generally horizontal arm allows the scanning device to move a distance into the inside of the engineering defined work piece 32 (e.g., at least 40 inches into an aircraft wing to allow measurement for manufacture of riblets). Additionally, a support 50 of the scanner 42, illustrated as a generally vertical arm allows the scanning device to move a distance upwards and downwards to scan the entire outside surface (e.g., sides, top and bottom) of the engineering defined work piece 32 (e.g., move upward or downward a defined distance, which may be based on the size or dimensions of the engineering defined work piece 32).

Each of the scanners 42 and 44 are capable of movements using a ground vehicle 52 and 54, respectively, on which the scanners 42 and 44 are supported, which may be a removable coupling thereto. In various embodiments, a controller 56 (e.g., a handheld controller operated by the individual 40 for remote control, also shown in FIG. 1) may be used to facilitate control or confirm programming of the operation and movement of the vehicles 52 and 54 to position the scanners 42 and 44, as well as control movement of the scanners 42 and 44 (e.g., laser scanning portions of the scanners 42 and 44). For example, the controller 56 may be operationally coupled to the scanners 42 and 44, and the vehicles 52 and 54 to control operation thereof. The operational connection may be wired and/or wireless. Additionally, the controller 56 may provide for the control of different operations or movements of the scanners 42 and 44, and the vehicles 52 and 54, as desired or needed.

It should be noted that the scanning devices may be any suitable measurement device, such as any suitable laser measurement devices. For example, the scanning devices may be three-dimensional (3D) non-contact laser measurement scanners or other type of laser measurement system or tool. Additionally, as can be seem, a support structure 46, which is movable, allows placement of the engineering defined work piece 32 within the engineering defined work zone 24.

Thus, in various embodiments, the system 20 may be used to perform measurements that allow for designing or manufacturing parts for an aircraft. The system 20 in various embodiments is configured to allow measurement scanning of the engineering defined work piece 32, which may include, for example, scanning of a composite surface or a metal surface with a core, such as for pivot fitting.

Figure 4:
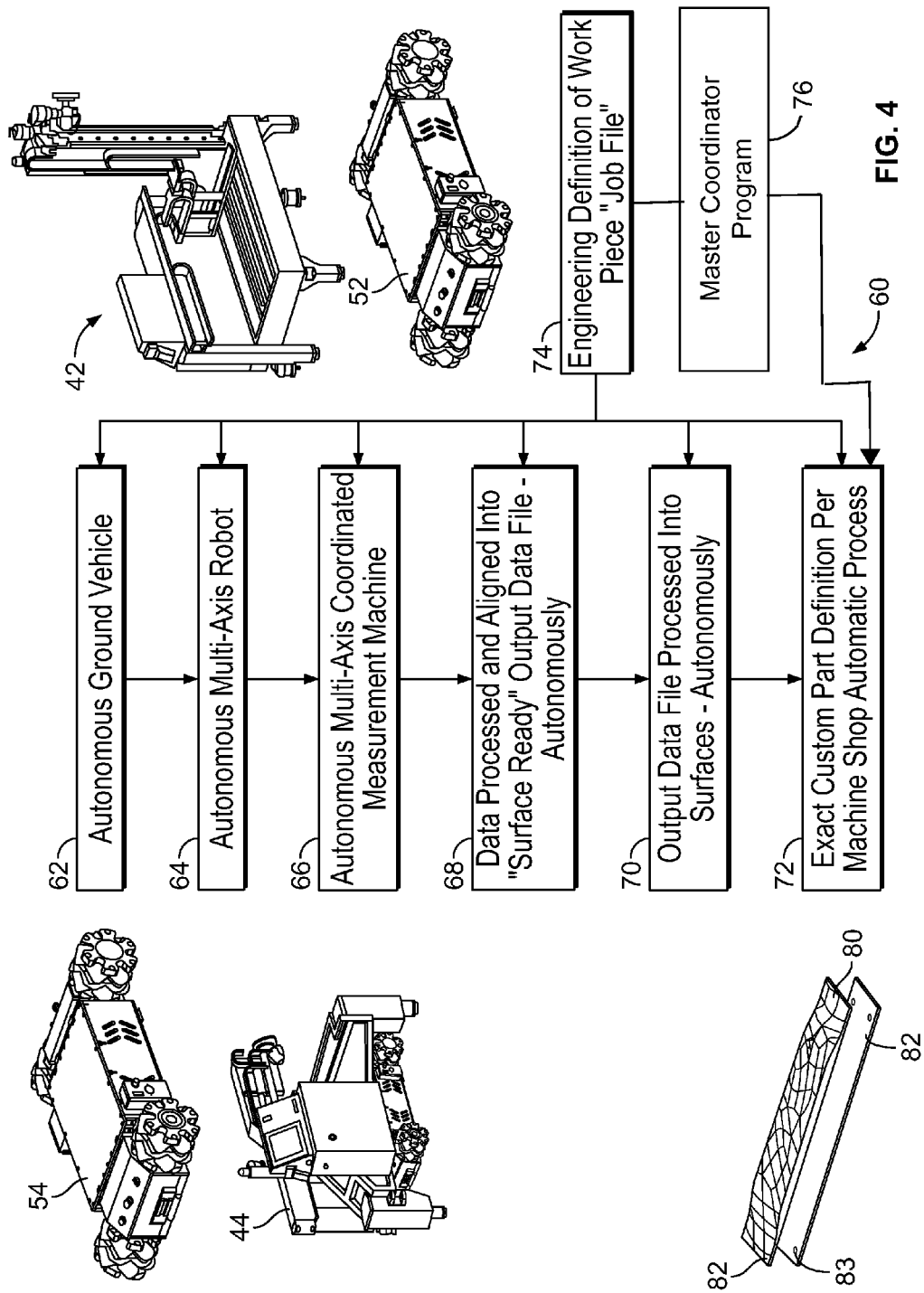
FIG. 4 is an illustration of operations for performing automatic part measurement in accordance with one embodiment.

FIG. 4 is a block diagram illustrating the different components of and operations performed in accordance with various embodiments, such as using the system 20. A general description will first be provided followed by a more detailed description. The blocks of the flow diagram 60 in FIG. 4 generally represent different components and/or operations performed in accordance with various embodiments. It should be noted that when various steps in accordance with one or more embodiments are described herein, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

As can be seen in FIG. 4 (and with reference also to FIGS. 1-3), control of an autonomous ground vehicle may be performed at 62, which may be embodied, for example, as the ground vehicle 52 or 54. It should be noted that other types of ground vehicles may be provided. The control of the autonomous ground vehicle may include controlling movement of the autonomous ground vehicle within the facility defined work zone 28 to different areas therein, such as to the setup calibration station 26 and/or the engineering define work space 24.

Additionally, control of an autonomous multi-axis robot may be performed at 64, for example, control of a scanner movement device supported on the autonomous ground vehicle. For example, the multi-axis robot may include the support 48 or 50 and allow movement of the scanning device (e.g., laser scanner) in a plurality of different directions, such as along the support 48 or 50 (e.g., translating movement) or other types of movement, such as pivoting or rotating movement.

Control of an autonomous multi-axis coordinated machine may be performed at 66. For example, the laser scanner portion of the scanning machine 30 may be controlled to move the laser scanner and perform laser measurements of the engineering defined work piece 32. Thus, the scanners 42 and 44 may be controlled to move the scanning devices and position the scanning devices to calibrate and/or perform measurements as will be described in more detail herein. It should be noted that the control at 62, 64 and 66 may be performed using the same controller and/or the same programming or programmed commands.

The control operations at 62, 64 and 66 allow for the scanning machine 30, which may be the scanner 42 or 44 to acquire measurement data (e.g., contour measurements), such as laser measurements of the engineering defined work piece 32. In various embodiments, during and/or after acquisition of the measurement data, the data is processed at 68, which may include aligning the data into a "surface ready" output data file for processing to manufacture a part. For example, the data may be processed in any suitable manner, such as to allow input to a CAD program for use in manufacturing a part for the engineering defined work piece 32. It should be noted that this processing in various embodiments is performed autonomously. One example of processing that may be performed at 68 is described in U.S. Pat. No. 7,974,722, which is commonly owned.

After the data is processed, an output is generated, for example, an output data file is generated at 70, which may be performed autonomously. It should be noted that when reference is made herein to performing an operation autonomously in various embodiments, this includes performing the operations with no or reduced user interaction and/or initiation. In various embodiments, the output data file is processed into surfaces defining the contour of a piece or part that may, for example, be coupled or mated to the engineering defined work piece 32.

Using the data output file, a custom part definition may be provided at 72, such as per the input format or configuration for a shop automatic process, which may include a filler definition (e.g., define shim dimensions). For example, the data output file may be used to generate control commands to control a manufacturing machine (e.g., CNC machine) to manufacture a piece or part based on the measurements and for the engineering defined work piece 32. For example, a piece 80 may be manufactured having mounting locations (e.g., mounting holes 83) that match a piece 82 to which the piece 80 is to be mounted, such as the engineering defined work piece 32.

In various embodiments, electronic aligning is performed at 68 that includes fitting a surface from unprocessed (scan) data, producing a file, which is then converted into XML. The XML file is then converted into NC code by CATIA, the NC code being used by the CNC machines to produce the shim. The electronic data aligning is, thus, a "merging" of data (from multiple scans, from multiple independent scanners). This mathematical aligning provides data that describes the filler (e.g., shim) shape.

In some embodiments, for example, the "as built" data allows for the automated alignment of the two (left and right) halves of the part (e.g., stabilizer) on respective tools for eventual attachment to one another. For example, the separate wheeled platforms (e.g., jigs) supporting the two halves of the stabilizer are automatically aligned based on the scan data. Misalignment of the two parts is determined based on the automated scan of features on the two parts. The scan data in various embodiments also may be used in the fabrication of fillers between the ribs and skin sections for each half of the stabilizer as well as the alignment, for joining, of the two completed stabilizer halves. Data used for part alignment is sent to a join tool (e.g., the wheeled platforms, such as the ground vehicles 52) to ensure virtual (and actual) alignment. A move profile is sent to the join tool based on "targets" that are outside of the scanner "world". Thus, targets are moved into the scanner coordinate system to ensure that the parts (the two halves of the stabilizer are sometimes referred to as "boxes") are in physical alignment.

In some embodiments, for example, a single file of a job file instructs the scanner how to move around the part to be scanned. It should be noted that multiple job files and scans may be needed to generate enough information to build a filler.

One result of the scanning process is that the process can be used to verify the accuracy of the engineering files that originally define the parts. Accordingly, in certain circumstances the scan data can be feedback to engineering, and any updates to the engineering part definitions can be made.

It should be noted that in various embodiments, part scan data is fit to a boundary. For example, a plane that fits the variable surfaces is defined. Mathematically, for example, two shims are defined, one for each variable surface, and then combined into one shim. For example, spars, ribs, and skins as defined by engineering and are saved in the job file, then the surfaces of the skins, spars, and ribs are measured by one or more robots (scanners) as described in more detail herein. The results of the robot measurements (scans) are used to generate filler predictions. This includes the measurement of the holes in the skins and spars. It should be noted that the accuracy of this entire process is in part based on the locating of the holes by the scanners.

It also should be noted that an engineering definition of the engineering defined work piece 32 may be provided as a job file at 74, which may be used in one or more of the steps, such as to define the different operations or control thereof, as described in more detail herein.

In the illustrated embodiments, an overall control of the process may be performed at 76 by a master coordinator program. For example, the master coordinator program may be a job crawler that includes a list for all job files, such a one line numbered file per project. For example, in one embodiment, the following process may be performed:

1. Autonomous ground motion coupled with autonomous multiple axis robot coupled with multi-axis coordinate measurement machine that takes directions of operation from a single self-contained instruction file for each individual scan job.

2. A multifunction raw data processor program uses a self-contained instruction file to guide the process of turning raw data into conditioned packaged calibrated datasets.

3. A self-contained file couples the control of engineering definition and the control of a robotic coordinate measurement machine and the control of data processing for a single scan job referred to as the job file herein.

4. A surfacing program uses a self-contained instruction file coupled with a database that acts a central repository of the useful outputs of various processed job files and the instructions on how to put all the datasets together to make predictive fillers (e.g., shims) that meet the input requirements for an automated filler (shim) shop.

5. A comprehensive control program (such the master coordinator program) for multiple product lines uses self-contained files to coordinate the operation of which tasks are taken by the robotic coordinate measurement machine, when to process the job files, when to join data together using the surfacing computer program, the storage, revision, archrival and disposal of various files and when to record that all tasks are complete. For example, the master coordinator program may define a comprehensive control program director.

6. A dynamic web based program monitors the progress, warnings and failures reported by the comprehensive control program allowing a summary view of the relevant manufacturing timeline.

7. A computer based simulator operating in a CAD environment of the robotic coordinate measurement machine in conjunction with a representation of parts and assemblies to be scanned and a simulation of the control interface on that machine coupled with useful calculation tools available in the data calculator program for the purpose of creating job files that operate without incident and as-designed the first time the files are used in production.

Figure 5:
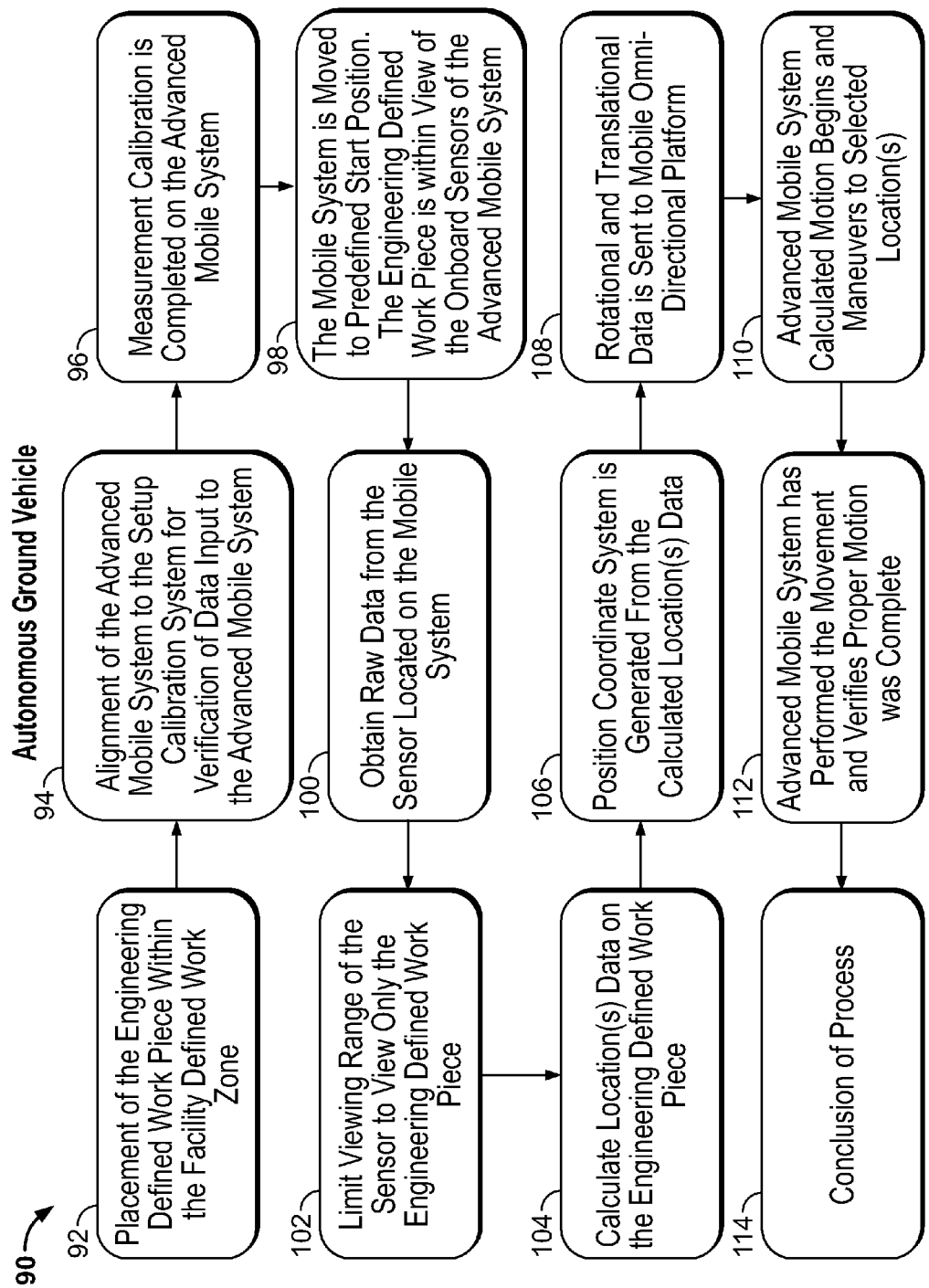
FIG. 5 is an illustration of operations for performing ground vehicle control in accordance with one embodiment.

A method 90 as illustrated in FIG. 5 may be used to control the autonomous ground vehicle at 62 to move the scanner 42 and/or 44 to perform operations of various embodiments. In particular, the method 90 includes at 92 initially placing the engineering defined work piece 32 within the facility defined work zone 24. For example, the engineering defined work piece 32 may be moved into location with the facility define work zone 24, after which the engineering defined work piece 32 is not touched or contacted until all measurements have been performed in accordance with various embodiments.

The method 90 includes alignment of the advanced mobile system 22 to the setup calibration station 26 at 94. For example, in one embodiment, the alignment includes moving the advanced mobile system 22 with the scanner 42 and/or 44 to the setup calibration station 26 to calibrate the scanner 42 and/or 44. The calibration may include, for example, verification of a data input to the advanced mobile system 22, which controls movement of the scanner 42 and/or 44 thereon. The measurement calibration may be performed using templates, such as on the floor or in a box that includes predefined openings or holes. Thus, for example, the measured locations of the holes by the scanner 42 and/or 44 may be compared to the known locations of the holes and adjustments made (e.g., offsets) if the measurements do not match the known locations. The measurement calibration is the completed at 96.

After calibration of the scanner 42 and/or 44, the advanced mobile system 22 is moved to a defined start position at 98, which may be a predefined or predetermined start position within the facility defined work zone 28 based on a known location of the engineering defined work space 24. For example, in various embodiments, the engineering defined work piece 32 is within the view of onboard sensors of the advanced mobile system 22. In some embodiments, the advanced mobile system 22 includes the scanner 42 and/or 44, which in various embodiments may be, for example, a displacement laser that is used to measure the external or internal surface of the engineering defined work piece 32, respectively. Additionally, the advanced mobile system 22 includes another sensor in combination with each of the ground vehicles, which may be a safety laser 84, shown in FIG. 2 (which may be coupled to the ground vehicle or scanner 42 and/or 44) that scans the environment within the facility defined work zone 28. The safety laser may be used to guide the advanced mobile system 22 and prevent collision with objects within the facility define work zone 28.

Once the advanced mobile system 22 is moved into the start position (e.g., adjacent the engineering defined work space 24), which may be confirmed by an operator, such as visually, raw data is acquired from the scanner 42 and/or 44 at 100. For example, in various embodiments, the scanner 42 and/or 44 performs an initial scan of the engineering defined work space 24 at 102 to limit the viewing range or area of the scanner 42 and/44 to view only the engineering defined work piece 32. For example, in this initial scanning operation, a reduced amount of data is acquired and is used to define the limits of the scan. Accordingly, this operation can generally define the bounds of the contour of the engineering defined work piece 32 to be scanned, which may include defining the bounds of an external or internal scan of the engineering defined work piece 32. The viewing range may extend a distance beyond the edges of the engineering defined work piece 32 to ensure the complete engineering defined work piece 32 is measured.

The method 90 includes calculating location data on the engineering defined work piece 32 at 104. For example, the coordinates for a subsequent measurement scan to be performed are determined from the initial scan such that a position coordinate system may be generated at 106 from the calculated location data. For example, a raster scan pattern for scanning the internal or external surface of the engineering defined work piece 32 may be defined based on the initial scan of the engineering defined work piece 32. It should be noted that different types of scan procedures or patterns may be defined, such as based on the type and shape of the engineering defined work piece 32.

Once the position coordinate system and the locations are defined, movement data, for example, rotational and translational data or commands are sent to the multi-axis robot at 108 to control the movement of the scanning portion of the scanner 42 and/or 44. For example, commands are sent to control movement of the scanner 42 and/or 44 to scan within the defined bounds of the engineering defined work piece 32 as determined from the initial scan. Thereafter, motion of the scanner 42 and/or 44 is performed such that the scanning portion thereof is moved to selected locations at 110, such as based on the defined scan pattern. A verification that the scan movements have been performed is provided at 112, which may include a user input verifying that the measurement data was acquired for the engineering defined work piece 32. The method then ends at 114.

Figure 6:
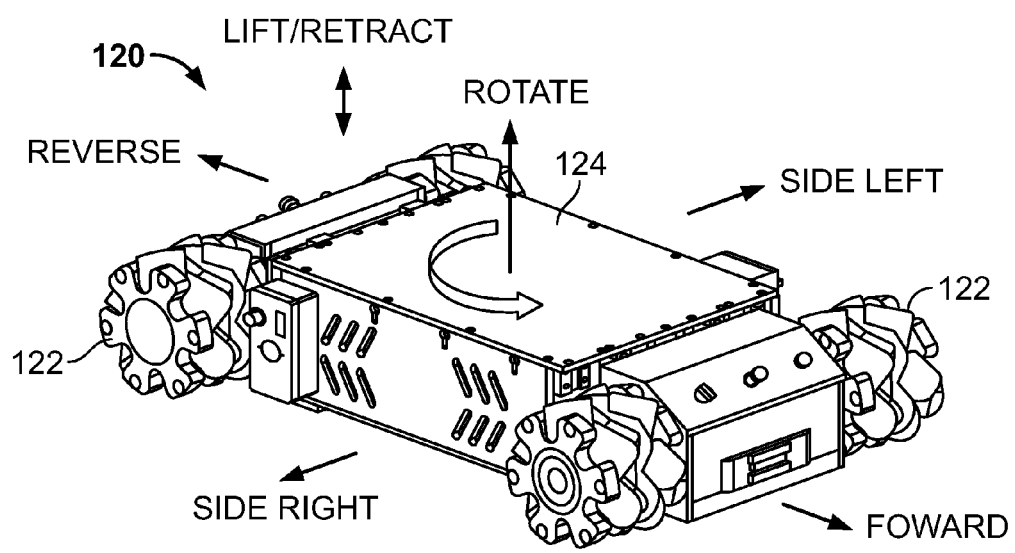
FIG. 6 is a diagram illustrating movements by a ground vehicle in accordance with one embodiment.

As shown in FIG. 6, a ground vehicle 120 having a plurality of wheels 122 may be provided that supports a platform 124 thereon. The wheels 122 are configured to allow movement along different axes, illustrated as forward/reverse and also may turn or pivot to allow movement left and/or right. Additionally, the platform 124 on which the scanner 42 and/or 44 is coupled is configured to provide rotational movement, as well as movement upwards and downwards. Thus, the autonomous ground vehicle 120 translates and rotates the robotic payload (e.g., the scanner 42 and/or 44) about the facility defined work zone 28 to provide alignment, for example, to the engineering defined work piece 32. It should be noted that this functionality can be integrated into the ground vehicle 120 or may be made detachable as a standalone device. In one embodiment, the vehicle 120 includes three or four Mecanum wheels 122, with each wheel 122 defining a servo driven axis. Additionally, in various embodiments, each wheel 122 can be moved vertically to either lift the wheel off the floor or lift the payload off the floor.

In operation, an onboard computer receives inputs from various sensors to calculate the optimum move command to accomplish the floor placement goals. For example, the facility defined work zone 28 may be the area within the manufacturing facility that the robotic system operates, namely the ground vehicle 120. The details (e.g., dimensions) of this facility defined work zone 28, as well as any areas therein, for example, the setup calibration station 26 and the engineering defined work space 24 are programmed into the computer (not shown) of the ground vehicle 120 for navigation.

In various embodiments, the advanced mobile system 22 integrates the ground vehicle 120 (e.g., omni-directional vehicle) underneath a multi-axis machine with multiple laser sensors (plus other optional sensors) on the ground vehicle 120 as described in more detail herein. The multiple sensors may be used to navigate the ground vehicle 120. It should be noted that geometric features and dimensions are itemized in the job file. These features are back calculated to the coordinate system of the ground vehicle 120 and used for navigation.

Various embodiments of multi-axis robots will now be described and which may be controlled, for example, at 64 (shown in FIG. 4). In general, the multi-axis robots are configured having at least a multiple translation axis and a rotation axis, wherein the last axis is the measurement device, for example, a displacement probe sensor or a laser displacement sensor.

Figure 7:
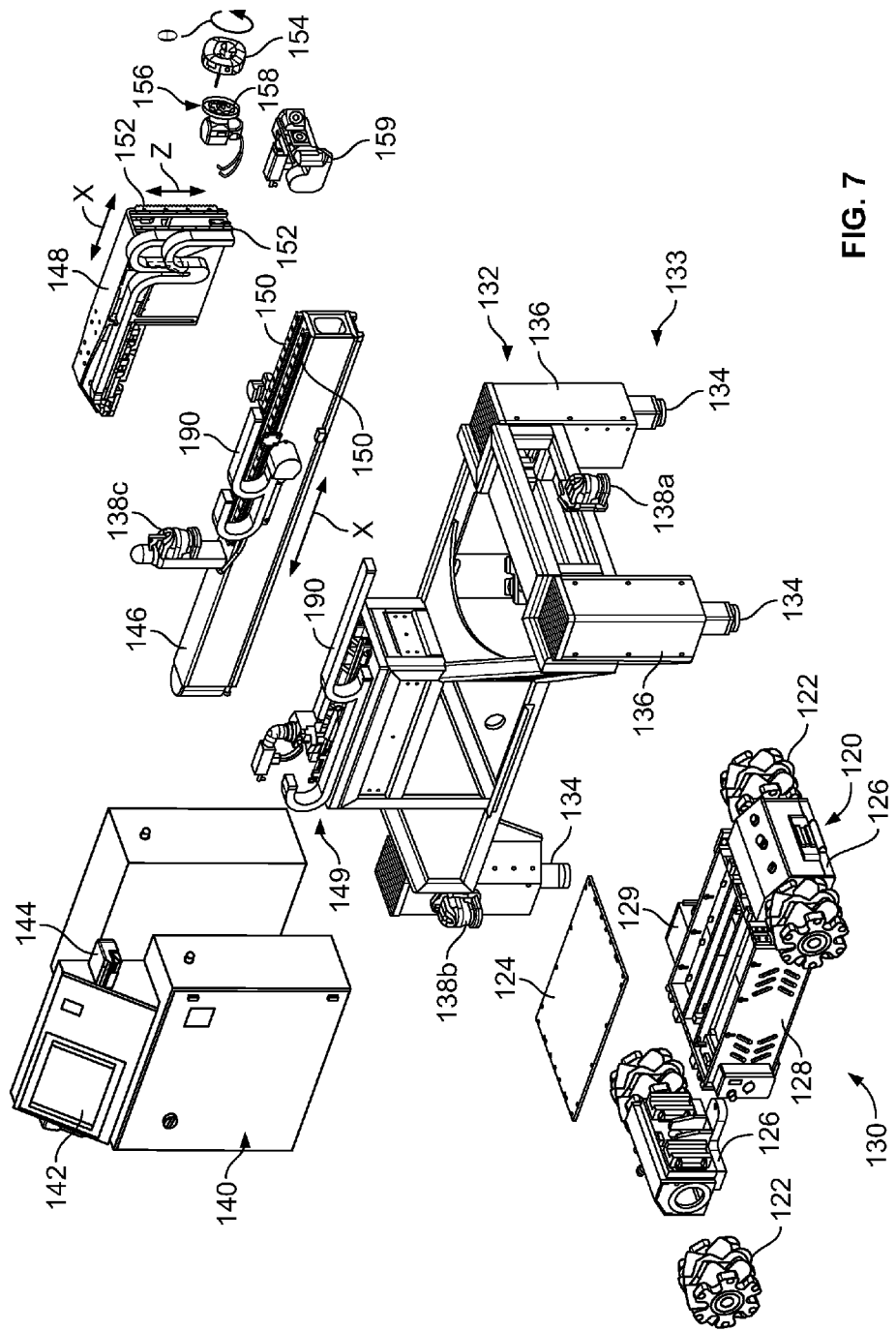
FIG. 7 is an exploded view of a multi-axis robot in accordance with one embodiment.

More particularly, FIG. 7 illustrates one embodiment of a multi-axis robot 130 that includes the ground vehicle 120. FIG. 7 is a partially exploded view of the multi-axis robot 130. The multi-axis robot 130 may be embodied, for example, as the scanner 44 and configured to perform measurement operations as described herein. However, the multi-axis robot 130 may be embodied as a different scanner or device. As can be seen in FIG. 7, the ground vehicle 120 in the illustrated embodiment also includes a cart lift axis 126 coupled to the wheels 122 and the main body 128 that allows for lifting of the ground vehicle 120 on one or both ends of the ground vehicle 120. For example, the cart lift axis 126 may be a hydraulic lift system allowing lifting or raising of one or both sides of the ground vehicle 120, which may allow for leveling the multi-axis robot 130 on an uneven surface or tilting of the multi-axis robot 130. The cart lift axis 126 may be any type of system allowing for raising and lowering of the ground vehicle 120.

The multi-axis robot 130 also includes a scanning machine base 132 (e.g., table base), which in the illustrated embodiment is a support table configured to support thereon the measurement scanning components. The base 132 includes a robotic jack system 133, which in one embodiment includes a plurality of moveable legs 134 to lift the base 132, such as for receiving the ground vehicle 120 thereunder or for leveling the multi-axis robot 130. The legs 134 may extend into vertical supports 136 (e.g., main legs) of the base 132 and are configured to translate vertically within and out of the vertical supports 136.

The multi-axis robot 130 also includes one or more safety lasers (or navigation lasers) 138 coupled to the base 132. The safety lasers 138 in some embodiments are embodied as the safety laser 84. The safety lasers 138 are generally coupled and positioned to the base 132 to allow viewing of the environment surrounding at least a portion of the multi-axis robot 130 (including in front of and to the side(s) of the multi-axis robot 130). The safety lasers 138 are operable to guide the multi-axis robot 130, such as within the facility defined work zone 28 as described herein. As can be seen, in the illustrated embodiment, one safety laser 138a is coupled to a front of the base 132 and one safety laser 138b is coupled to a side of the base 132 to provide different viewing angles and ranges. Alternatively or optionally, other safety lasers, such as the safety laser 138c may be provided, which is illustrated as mounted to a top of the base 132, but which may be positioned at any location.

A controller 140, which may be embodied as any type of processing machine (e.g., including a CPU) is also provided and is configured to be coupled to the base 132. The controller 140 may include a user input and display, which in the illustrated embodiment are embodied as a touchscreen display 142. The controller 140 also may include other input devices, such as a barcode reader 144 that is used to verify authorized access to the controller 140 (e.g., by swiping a security card with a barcode). However, it should be appreciated that other types of input devices (e.g., keyboard, mouse, etc.), as well as other types of security devices (e.g., fingerprint scanner), may alternatively or optionally be provided.

The multi-axis robot 130 includes a horizontal support 146 configured to mount to a drive motor 149. The horizontal support 146 generally defines an x-axis of movement for performing scanning operations. Additionally, a secondary support 148 is configured to be mounted to the horizontal support 148 and generally defines a second x-axis of movement (farther than the first x-axis) and a z-axis of movement perpendicular to the x-axis. For example, the horizontal support 146 and the secondary support 148 may generally comprise rail systems or other moveable components (e.g., sprockets, gears, chain drives, etc.). In this embodiment, the secondary support 148 is movably coupled to the horizontal support 146 to allow x-axis movement relative thereto along rails 150 and the horizontal support 146 is coupled to the based to also allow x-axis movement relative thereto.

Additionally, in the illustrated embodiment, the secondary support 148 includes a rail system having rails 152 perpendicular to the rails 150 of the horizontal support 146 that allows movement of a measurement laser 154 (e.g., a laser displacement laser that measures distance or range therefrom) coupled thereto in the z-axis direction. The measurement laser 154 is mounted to the rails 152 via a rotating member 156, which in one embodiment includes a slip ring 158 allowing rotation of the measurement laser 154, thereby defining a theta-axis of movement. A drive motor 159 is also provided to drive and control the movement of the measurement laser 154.

In operation, the measurement laser 154 may be moved in the x-axis direction (generally horizontally in the illustrated embodiment) by movement of the horizontal support 146 (e.g., a distance) and/or the secondary support 148 along the horizontal support 146 (e.g., an additional distance), such as to move the measurement laser 154 into an aircraft wing part. Additionally, the measurement laser 154 may be moved in the z-direction (generally vertically in the illustrated embodiment), as well as rotated, such as to gain access to the interior of the part to be measured, as well as while inside the part, for example, the engineering defined work piece 32. Thus, the measurement laser 154 may be moved or driven along or about one or more axes to calculated machine coordinates for an engineering definition of the part as described in more detail herein. Thus, the x-axis movement in some embodiments is perpendicular to the z-axis movement. However, one or more of the axes may define different transverse movements relative to each other.

Figure 8:
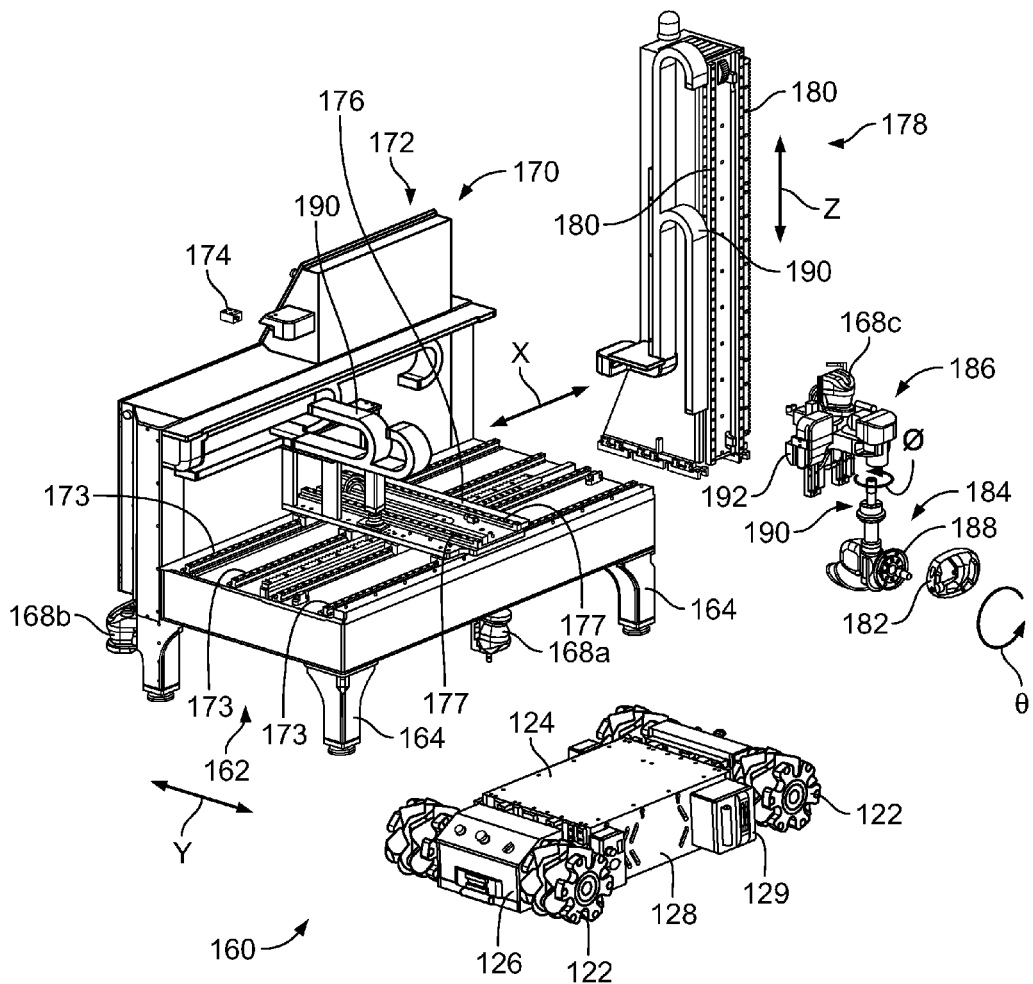
FIG. 8 is an exploded view of a multi-axis robot in accordance with another embodiment.

FIG. 8 illustrates another embodiment of a multi-axis robot 160 that includes the ground vehicle 120. FIG. 8 is a partially exploded view of the multi-axis robot 160. The multi-axis robot 160 may be embodied, for example, as the scanner 42 and configured to perform measurement operations as described herein. However, the multi-axis robot 160 may be embodied as a different scanner or device. As can be seen in FIG. 8, the ground vehicle 120 in the illustrated embodiment also includes a cart lift axis 126 coupled to the wheels 122 and the main body 128 that allows for lifting of the ground vehicle 120 on one or both ends of the ground vehicle 120. For example, the cart lift axis 126 may be a hydraulic lift system allowing lifting or raising of one or both sides of the ground vehicle 120, which may allow for leveling the multi-axis robot 160 on an uneven surface or tilting of the multi-axis robot 160. The cart lift axis 126 may be any type of system allowing for raising and lowering of the ground vehicle 120. As can be seen more clearly in FIG. 8, a controller 129 is also provided to control movement of the ground vehicle 120 (e.g., wireless control or preprogrammed movement based on a coordinate file download).

The multi-axis robot 160 also includes a scanning machine base 162, which in the illustrated embodiment is a support table configured to support thereon the measurement scanning components. The base 162 includes legs 164, which in various embodiments include compliant feet. However, it should be appreciated that a robotic jack system, similar to the robotic jack system 133 of the multi-axis robot 130 also may be provided.

The multi-axis robot 160 also includes one or more safety lasers (or navigation lasers) 168 coupled to one of the ends of the base 162. The safety lasers 168 in some embodiments are embodied as the safety laser 84. The safety lasers 168 are generally coupled and positioned to the base 162 to allow viewing of the environment surrounding at least a portion of the multi-axis robot 160 (including in front of and to the side(s) of the multi-axis robot 160). The safety lasers 168 are operable to guide the multi-axis robot 160, such as within the facility defined work zone 28 as described herein. As can be seen, in the illustrated embodiment, one safety laser 168a is coupled to a front of the base 162 and one safety laser 138b is coupled to a corner of the base 162 to provide different viewing angles and ranges. Alternatively or optionally, other safety lasers, such as the safety laser 168c may be provided, which is illustrated as mounted to a top of the base 162 but which may be positioned at any location.

A controller 170, which may be embodied as any type of processing machine (e.g., including a CPU) is also provided and is configured to be coupled to the base 162. The controller 170 may include a user input and display, which in the illustrated embodiment are embodied as a touchscreen display 172 (not visible in FIG. 8). The controller 170 also may include other input devices, such as a barcode reader 174 that is used to verify authorized access to the controller 170 (e.g., by swiping a security card with a barcode). However, it should be appreciated that other types of input devices (e.g., keyboard, mouse, etc.), as well as other types of security devices (e.g., fingerprint scanner), may alternatively or optionally be provided.

The multi-axis robot 160 includes a horizontal support 176 configured to mount to a rail system of the base 162 that includes rails 173, which in the illustrated embodiment are oriented longitudinally along a top surface of the base 162. A drive motor (not shown) is also provided to move the horizontal support along the rails 173. The horizontal support 176 also includes rails 177 that are perpendicular to the rails 173. Accordingly, the rails 173 define an x-axis of movement and the rails 177 define a y-axis of movement for performing scanning operations. Additionally, a secondary support, illustrated as a vertical support 178 is configured to be mounted to the horizontal support 176 and generally defines a z-axis of movement perpendicular to the x and y-axes. For example, the horizontal support 176 and the vertical support 178 may generally comprise rail systems or other moveable components (e.g., sprockets, gears, chain drives, etc.). In this embodiment, the vertical support 178 is movably coupled to the horizontal support 176 along the rails 177. Thus, the horizontal support 176 moves along base 162 in the x-axis direction and the vertical support 178 moves along the horizontal support 176 in the y-axis direction.

Additionally, in the illustrated embodiment, the vertical support 178 includes a rail system having rails 180 perpendicular to the rails 173 and 177 that allows movement of a measurement laser 182 (e.g., a laser displacement laser that measures distance or range therefrom) coupled thereto in the z-axis direction. The measurement laser 182 is mounted to the rails 180 via rotating members 184 and 186, which in one embodiment includes slip rings 188 and 190, respectively, allowing rotation of the measurement laser 182, thereby defining a theta-axis of movement and a phi-axis of movement. A drive motor 192 is also provided to drive and control the movement of the measurement laser 182.

Figure 9:
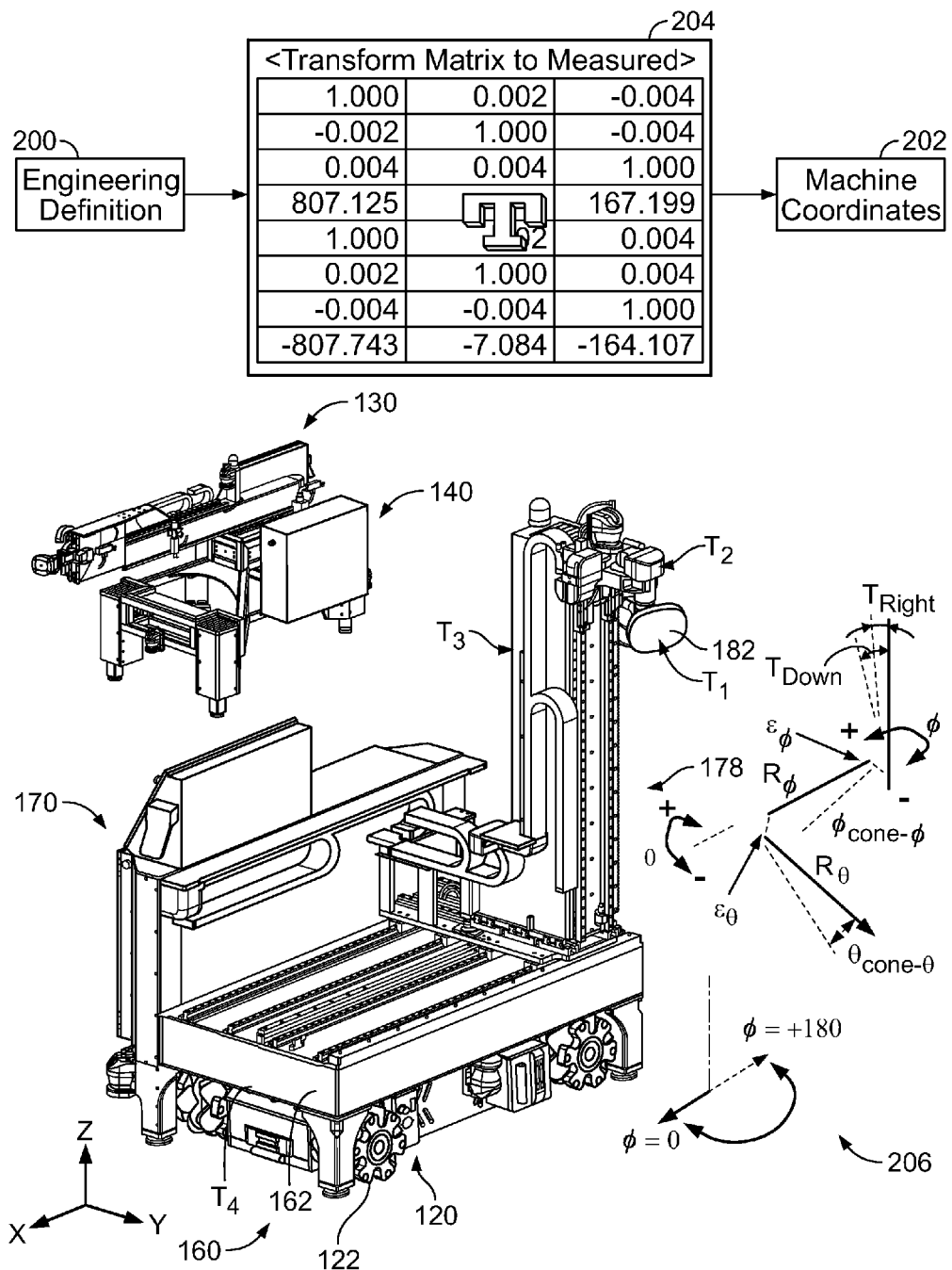
FIG. 9 is a diagram illustrating the control of movements of a multi-axis robot in accordance with various embodiments.

In operation, the measurement laser 182 may be moved in the x-axis direction (generally horizontally in the illustrated embodiment) by movement of the horizontal support 176 along the base 162, such as to move the measurement along and adjacent an outside surface of an aircraft wing part. Additionally, the measurement laser 182 may be moved in the y-direction by movement of the vertical support 178 along the horizontal support 176, such as to move the measurement laser 182 closer or farther from the aircraft wing part. The measurement laser 182 also may be moved the z-direction (generally vertically in the illustrated embodiment), as well as rotated in the theta and phi-directions along and adjacent to the part, for example, the engineering defined work piece 32. Thus, the measurement laser 182 may be moved or driven along or about one or more axes to calculated machine coordinates for an engineering definition of the part as described in more detail herein and as shown in FIG. 9. Thus, the y-axis movement in some embodiments is perpendicular to the x-axis movement and the z-axis movement. However, one or more of the axes may define different transverse movements relative to each other.

It should be noted that movement along the rails in the various embodiments may be provided using any suitable drive motors and one or more control arms. However, it should be appreciated that the components shown are for illustration only and different arrangements are contemplated that provide the various movements.

With reference to FIG. 9, the onboard computer, which may form part of the controller 170 or 140, captures encoder outputs of each axis of multi-axis robot's coordinate measurement side (from encoders mounted thereto, not shown). Additionally, the motorized side of the multi-axis robot 130 and/or 160 has an encoder system (not shown). In various embodiments, these two encoder systems are associated mathematically to control drive components of the multi-axis robot 130 and/or 160. For example, the multi-axis robot 130 and/or 160 in various embodiments is indirectly driven by an engineering definition 200 that is transformed to machine coordinates 202 using a mathematical transformation, such as a transformation matrix 204. It should be noted that any type of mathematical transformation may be used to define and control the different movements 206 of the multi-axis robot 130 and/or 160.

Figure 10:
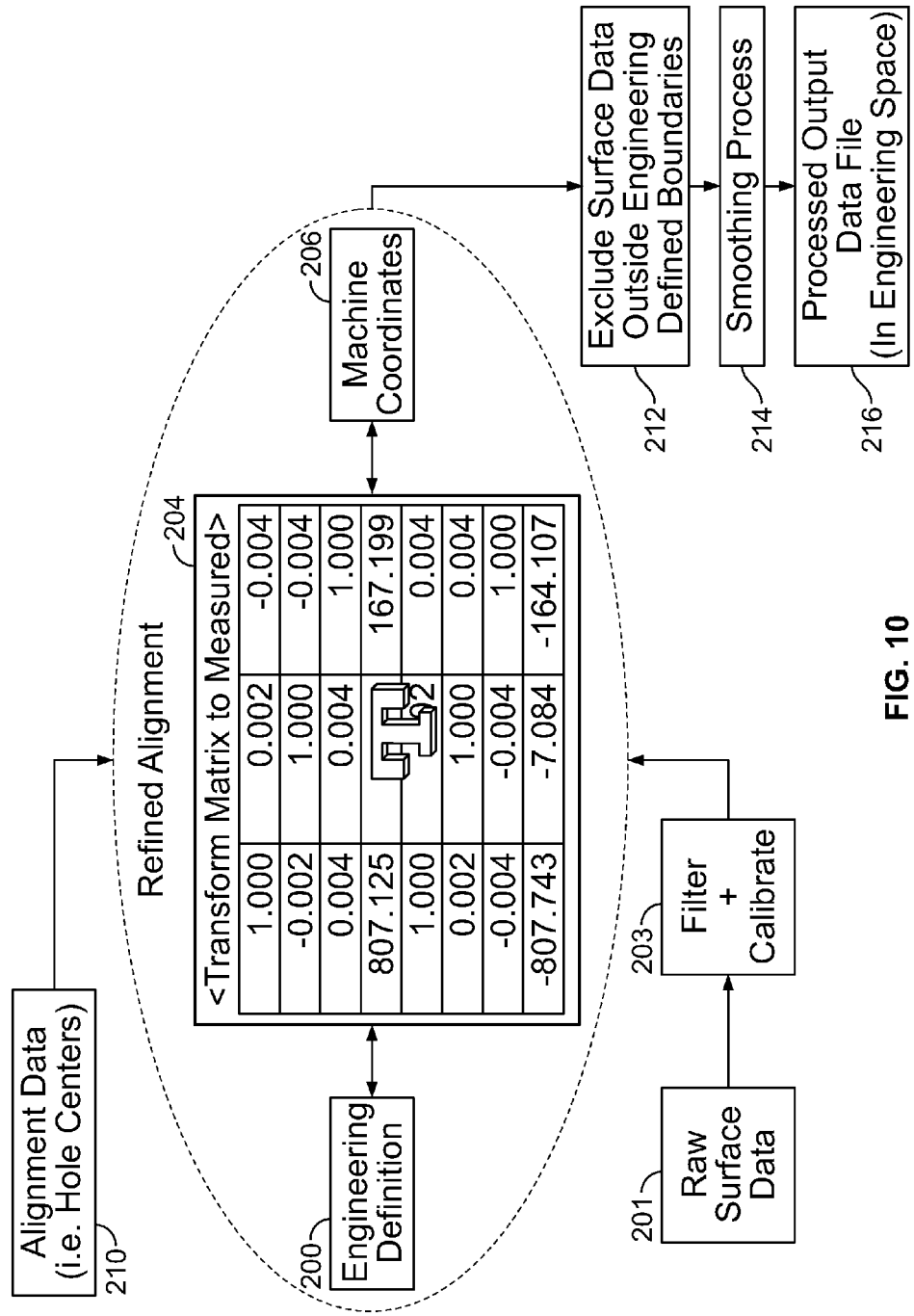
FIG. 10 is an illustration of operations for generating an output file in accordance with various embodiments.

More particularly, as shown in FIGS. 10, at 68 and 70 (shown in FIG. 4) and with respect to data processing, alignment data 210, such as certain alignment features (e.g., hole/cylinder centers, sphere centers, projected edges, vertices, surfaces and planes) are used to best fit and align the engineering definition 200 to the machine coordinates 206. It should be noted that the reverse is also calculated. Thus, a refined alignment may be determined based on the alignment data 210, as well as the raw surface data received at 201, which may be filtered and calibrated at 203.

In various embodiments, surface algorithms may be used to generate an output for use in manufacturing or machining the part. For example, in one embodiment the surface data acquired by the multi-axis robot 130 and/or 160 is filtered and calibrated. It should be noted that the same transformation/rotation is applied. In various embodiments, surface data outside of the engineering boundaries is discarded or excluded at 212, with the remaining data smoothed at 214 (e.g., using a data smoothing process) and written to an output data file at 216, which is best-fit aligned to the engineering space.

Figure 11:
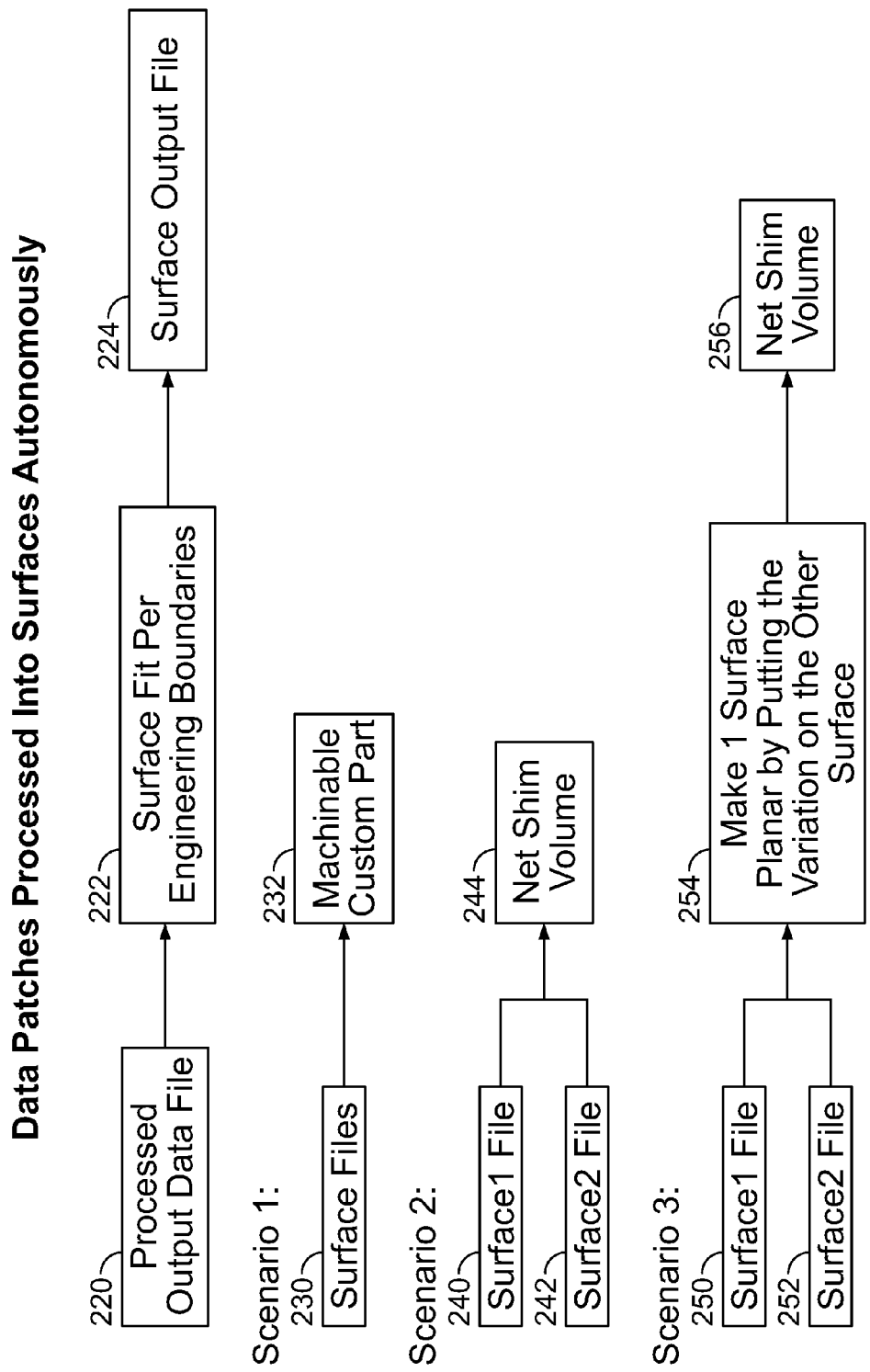
FIG. 11 is an illustration of operations for generating surface definitions for an output file in accordance with various embodiments.

In various embodiments, the data, for example, data patches are processed into surfaces autonomously as shown in FIG. 11. In general, the output data file is processed at 220 and surface fit at 222 per engineering boundaries to generate a surface output file at 224. FIG. 11 illustrates different possible scenarios. For example, a surface file 230 may be processed to generate an output file to manufacture a machinable custom part 232. As another example, a plurality of surface files 240 and 242 are processed to generate a net shim volume 244 for manufacturing a custom part. As still another example, a plurality of surface files 250 and 252 are processed at 254 to make one surface planar and putting variations on the other surface, to generate a net shim volume 256. In various embodiments, the shim surface is best fit in the engineering space, which may be transformed to a shim surface in a "nominal" engineering space. Thus, a custom "all-in-one" file with specific job codes, hole locations and surface definition may be provided.

Figure 12:
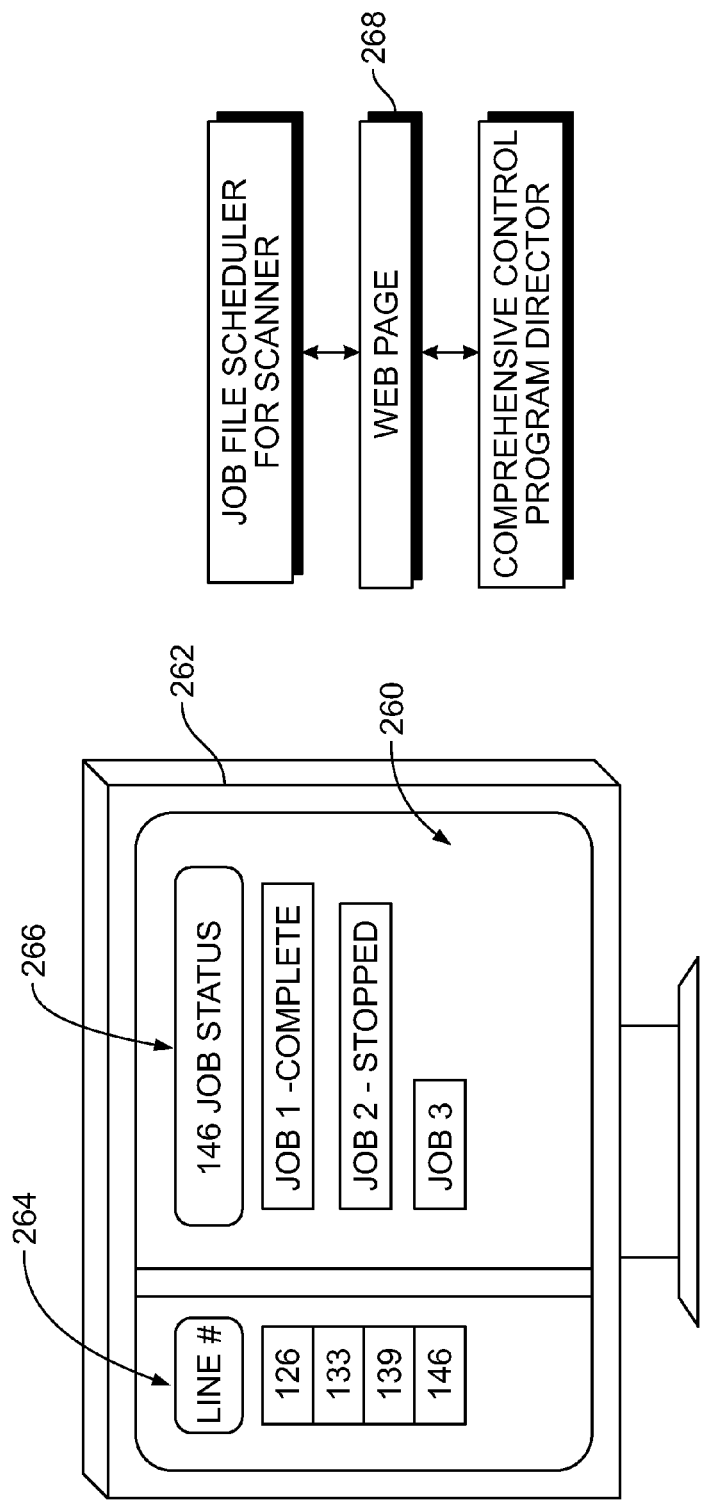
FIG. 12 is an illustration of a user interface in accordance with an embodiment.

For example, as shown in FIG. 12, a user interface 260 may be displayed on a display device 262 (e.g., monitor) that defines a dynamic web based program that monitors, for example, the progress, warnings and failures reported by the comprehensive control program (such as the master coordinator program shown in FIG. 4) allowing a summary view of the relevant manufacturing timeline. Thus, in operation, a user will view the user interface 260 to monitor the automated data processing progress.

Different types of information may be displayed, for example, the serial numbers or line numbers 264 of the projects scheduled, complete, in-progress and still to come jobs. As can be seen, each job for each line number is shown and the status milestone of each job may be displayed as status information 266. In various embodiments, an alert for warnings status and halted status of a job may be provided. Additionally, a scheduled job files release and revision level control for forthcoming line numbers may be provided.

As can be seen, the user interface 260 may be a web page 268 that interfaces within a job file scheduler for the scanners and the comprehensive control program and can control the operation of the comprehensive control program.

Figure 13:
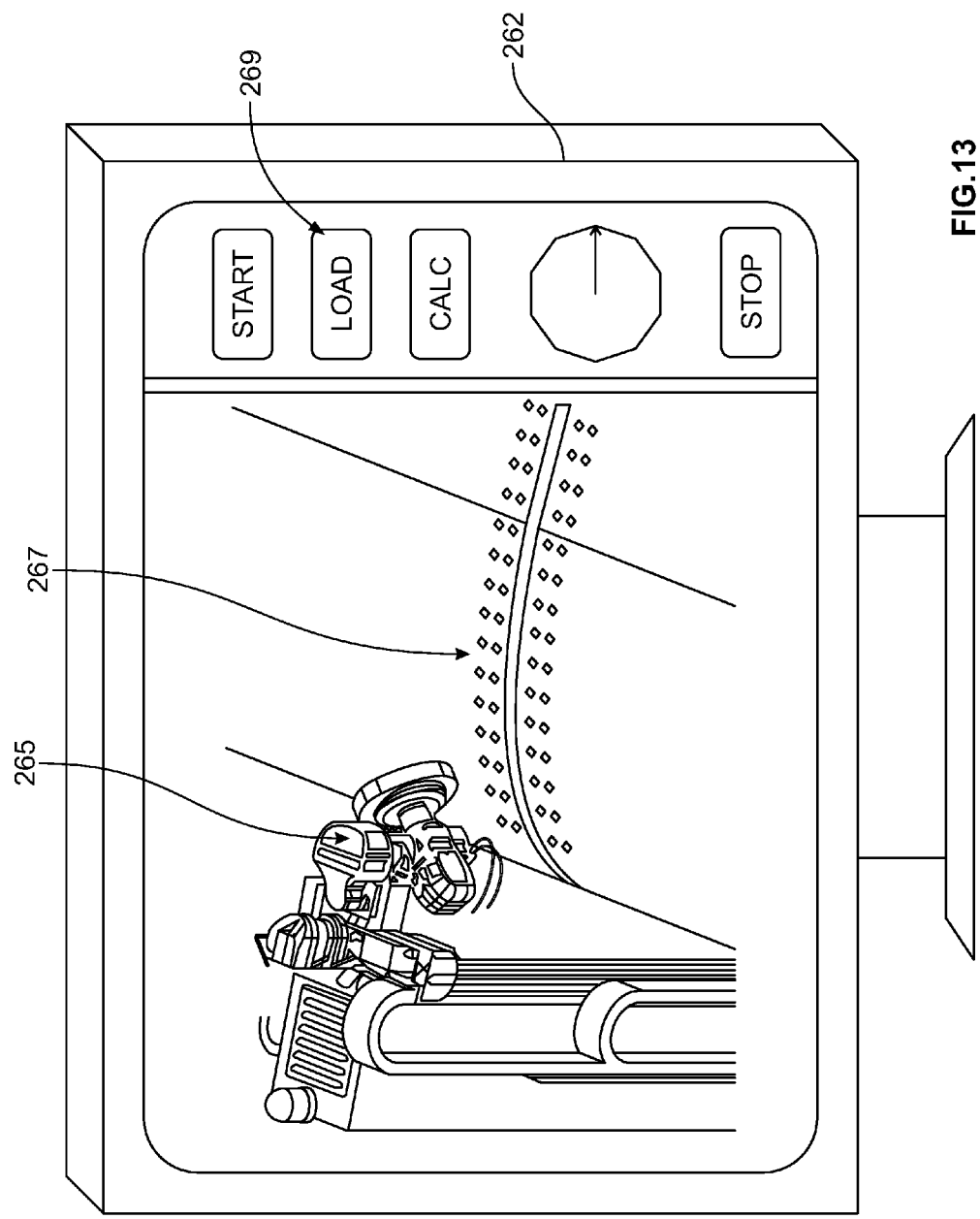
FIG. 13 is an illustration of another user interface in accordance with an embodiment.

As shown in FIG. 13, the display 262 may display a computer based simulator operating in a CAD environment of the robotic coordinate measurement machine 265 (e.g., a 3D kinematic model of the scanner) in conjunction with a representation of parts 267 (e.g., a 3D model of the part) and assemblies to be scanned and a simulation of the control interface on that machine coupled with user selectable members 269 (e.g., virtual buttons that define a simulated scanner control interface), that may access, for example, calculation tools available in a data calculator program for the purpose of creating job files that operate without incident and as-designed the first time used in production. Using the computer based simulator, scanner job files can be created in advance of the real production article such that the risk of damaging a very expensive robot and/or a production part is minimized from testing programs for the first time on a real machine with a real part, including the cost avoidance of occupying the use of a real machine and production parts for job file development. In some embodiments, the displayed information may be used as a training aid for machine operators and the avoidance of costly learning errors, as well as providing the ability to create and support production operations in a different part of the world without having to travel there.

In various embodiments, robotic laser scanning is provided for creating parts that are fitted for coupling together, as well as to define predictive shims. For example, one or more of the multi-axis robot 130 or multi-axis robot 160 is configured to acquire "as built" part data, which is then used when joining different parts (e.g., two stabilizer halves) and fabricating one or more fillers (e.g., shims) as needed. For example, in some embodiments, machine and job file adjustment for height using immediate laser feedback is provided as described herein. For example, the multi-axis robot 130 or multi-axis robot 160 in various embodiments includes laser scanner capabilities as a precision feedback device for aligning or configuring parts and assemblies. The use of a laser scanner as a configuration of delicate aircraft structure in conjunction with adjustable fixtures is provided to achieve a desired or required engineering configuration. In some embodiments, an on board camera on the laser scanner may be provided for record keeping of the operations (play by play action) of the robotic movements relative to a part or assembly (e.g., still images or video). In some embodiments, a vision system may be provided as an alternate for positioning or feature recognition.

Figure 14:
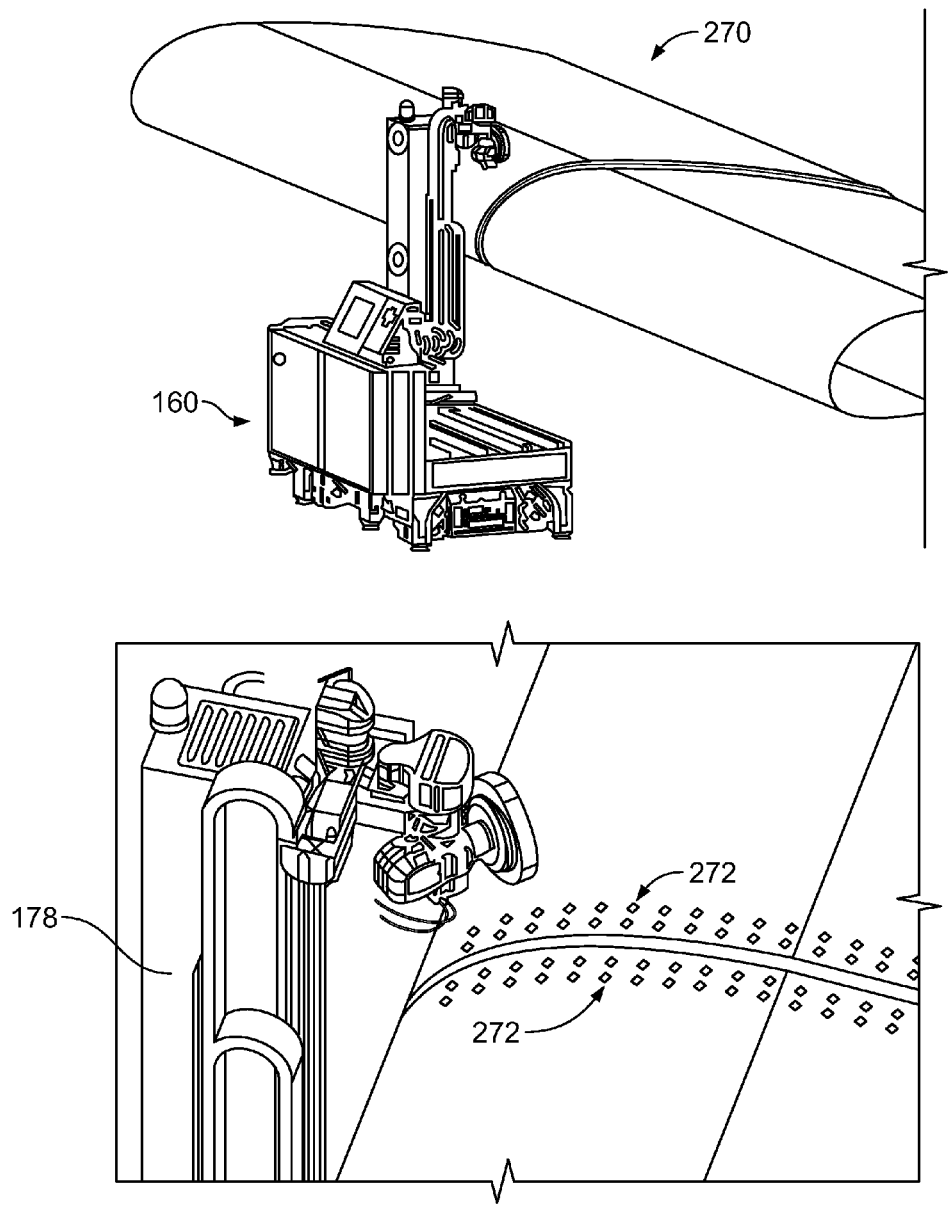
FIG. 14 is an illustration of laser feedback provided in accordance with an embodiment.

For example, as shown in FIG. 14, illustrating the multi-axis robot 160 (shown in Figure detail in FIG. 8), machine and job file adjustment may be performed for height using laser feedback (such as provided by the measurement laser 182 shown in in FIG. 8). For example, the structure 270 being scanned is often not placed exactly in the same place each time for scanning. Additionally there are part assembly variations that cause the structure 270 to appear in a different location with respect to the scanner. Finally, the scanner itself may not be located exactly in the same place on the floor and the floor may have variations that cause a relatively setup difference. Accordingly, a slight difference may exist in different scanners running the same job files. In various embodiments, laser measurements may be used as real-time or immediate feedback to adjust the scanner jacks (e.g., robotic jack system as described herein) or adjust one or more of the axis target values posted in the job file. As such, the scanner can be properly placed in height so the scanner does not collide with the structure 270 and so that different routines, for example a hole find routine to locates one or more holes 272 on the structure 270 can be performed (or to locate other features).

For example, aligning the structure 270 (which may be a large structure, such as an aircraft stabilizer or wing) to be joined to other large structures involves the use of large equipment with large metrology systems for primary position feedback. However, while this arrangement may work for general placement of large assemblies, such arrangement may not always meet the alignment needs for certain applications, such as precision predictive shims that have been built for the joining interfaces, as a result of, for example, setup errors, a loss of positioning accuracy of the positioning equipment, and the loss of accuracy of metrology systems at long distances. In various embodiments, the laser scanner operation is very accurate at small distances and can use predrilled holes and features as buck-in features (without target setup errors) to help the system identify and achieve the end goal location. Thus, using laser feedback information, autonomous operations may be performed as described herein.

Figure 15:
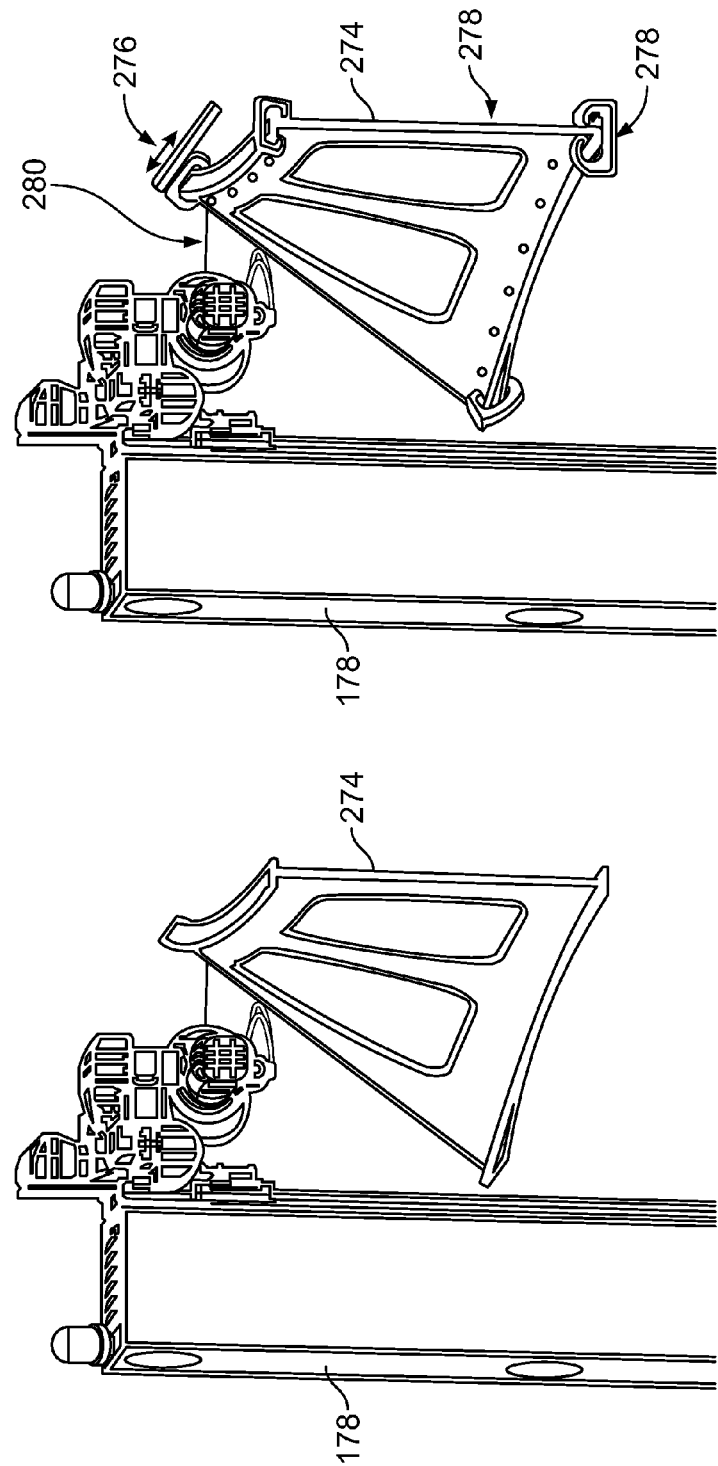
FIG. 15 is an illustration of supporting fixtures in accordance with an embodiment.

Additionally, one or more parts may not have adequate structural support prior to assembly and various embodiments use laser scanning operation for feedback on the manipulation or movement of these parts in combination with adjustable fixtures to achieve engineering configuration. For example, to save weight, aircraft designers may create structures that are as light weight as possible. In some situations, a substructure may be very flimsy when all pieces of the final assembly are not present. Various embodiments allow for predictive shimming by scanning of such parts or assemblies in a "free state". Without the use of laser scanning, an actual free state may be a substructure that is collapsed or significantly far from design state. In various embodiments, flimsy or delicate substructure are fixtured and key features of the substructure physically manipulated into geometrical designed state before scanning. One or more robotic scanners as described herein can facilitate such operation. For example, in one embodiment, as illustrated in FIG. 15, one or more mechanical manipulators on the fixture allow the scanner to work and provide precision feedback to the manipulator. For example, as shown in FIG. 15, the structure 274 may include a movable manipulator restraint 276 and one or more fixed restraints 278 coupled to the structure to provide support and used with alignment targets 278 (e.g., illustrated as a series of markings, such as real or virtual dots) to properly align the structure 274 using a laser beam 280 that is capable of identifying and locating the alignment targets 278. It should be noted that although the manipulator restraint 276 and the fixed restraints 278 are shown coupled to the corners of the structure 274, the manipulator restraint 276 and the fixed restraints 278 may be coupled to different portions of the structure 274. Also, additional or fewer manipulator restraints 276 or the fixed restraints 278 may be provided.

In some embodiments, the scanner is configured to run through a job and produce modification data necessary as input to the manipulator (e.g., on the fly or real-time modification data). After the part is in "near" design state, the part or assembly can be scanned for predictive filler (e.g., shim) data.

Thus, flimsy structures may need support for all kinds of assembly operations. It is typical that the structure may be significantly rigid in at least one mode of bending. However, other modes like twisting for flat panel shapes, circularity on barrel shapes and diagonal stiffness on unsupported box shapes are prone to significant bending prior to being locked at final assembly. The manipulator restraint 276 or the fixed restraints 278, as well as other means of restraining and manipulating these shapes may be used, such as based on the shape of the structures 274 and physical properties thereof to support the structure in different modes. Additionally, the manipulators can be manually adjusted or completely automatic using computer control. In various embodiments, the alignment tools use more than one scanner and/or more than one different type of measurement device to achieve compliance with a desired or required design state.

In various embodiments, a camera 282 as shown in FIG. 16 may be provided. For example, the camera 282 may be coupled to the laser scanner for recording the robotic movements relative to the part of assembly, such as by acquiring still or video images. In some embodiments, a vision system may alternatively or additionally be provided for positioning of feature recognition. For example, the camera 282 may include a housing 284 having a video camera 286 therein, which may include an adjustable lens 288 that views a scene (e.g., showing the part) through an opening 290 in the housing 284. In the illustrated embodiment, a laser range finder 292, such as a CMOS laser may be included and capable of transmitting a laser beam 294 through an opening 296 in the housing 284. One or more camera lights 298 (e.g., LEDs) may be provided to allow for illumination as desired or needed. Thus, for example, in operation, the camera 282 may be able to view and identify debris 300 on a part 302 corresponding to an unexplained bump 304 in the data. In some embodiments, the debris may be, for example, a breakout on a surface of the part 302.

Thus, various embodiments may provide automated operation and confirmation of one or more conditions with respect to the system or part/structure of interest. In one or more embodiments, automation of data processing is provided for creating one or more predictive fillers (e.g., shims). In one particular embodiment, the data processing/workflow includes the following, which may be controlled, for example, by the master coordinator program at 76 (as shown in FIG. 4):

1. Determine if any of the scheduled jobs have been completed, such as periodically or determined time intervals. When such a determination is made, the event is recorded it in an Instruction list and proceeds to the next step.
2. Download all relevant files to a local working directory and un-compresses the raw data.
3. Begin executing commands that are called out in a step by step fashion in the job file.
4. After completing all the tasks in the list, advance to a quality control function.
5. The quality control function checks each processed output file for flaws that exceed defined tolerance and may be unacceptable.
6. Depending on other factors or dependencies identified in the Instruction list, a surface fit program is run to process the processed data.
7. After completion, the status is updated in the instruction list.
8. Perform alignment of parts with a reference to arbitrary names with an offset scalar.
9. Perform alignment of point to plane with point-to-point secondary priority.

Figure 17:
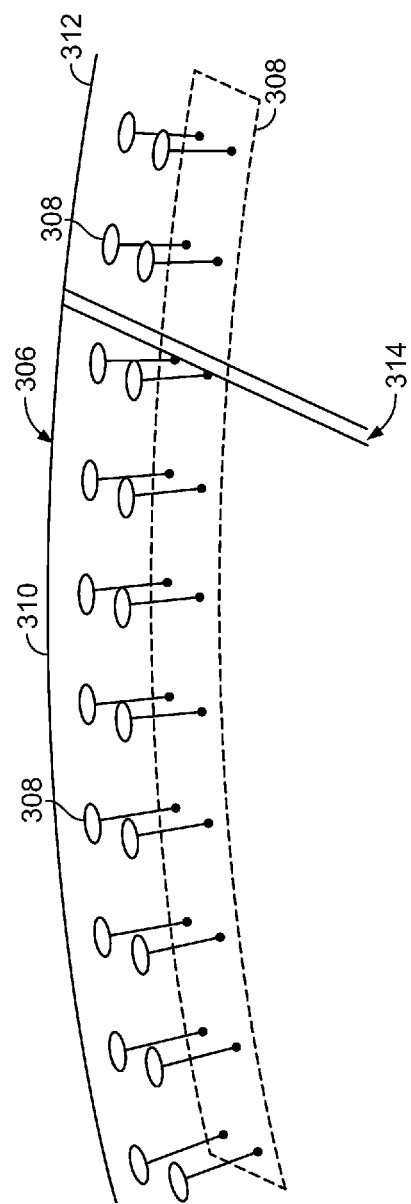
FIG. 17 is an illustration of an alignment process in accordance with an embodiment.

FIG. 17 illustrates an alignment to offset points that may be performed at step 8. For example, the placement of subassemblies 306 and 308 in space may be performed to make predictive shims. In various embodiments, an offset scalar is used that is multiplied by the vector of each mating hole 308. This process effectively puts a point in space at some distance away from the mating hole 308. The resultant alignment places a mating part 310 some defined distance evenly away from the other part 312. The resultant gap 314 is filled with a predictive shim, thereby defining a filler for later fabrication.

Figure 18:
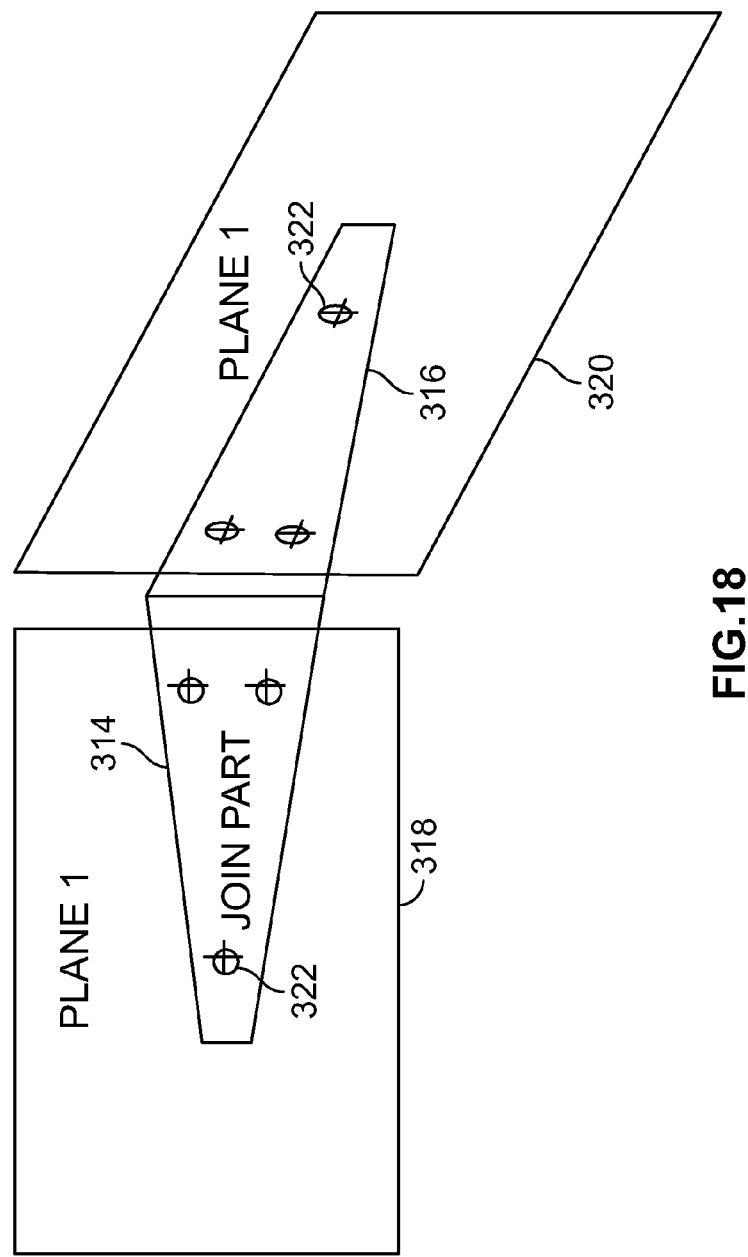
FIG. 18 is an illustration of another alignment process in accordance with an embodiment.

FIG. 18 illustrates an alignment of multiple point to plane interfaces that me be performed at step 9. For example, alignment of point to plane with point-to-point secondary priority may be performed. It may be desirable to not use a shim, but rather to place one part 314 flush against another part 316, which may include mating complex surfaces, but is illustrated as mating multiple planes 318 and 320. However, when mating the multiple planes 318 and 320, the predrilled holes 322 may not align (illustrated by the offset "+" markings). In various embodiments, the holes point can on the join part 314 and 316 aligned to each respective plane 318 and 320. It should be noted that the point to point fit is a secondary fit. In some embodiments, weighting the fits with, for example, a 100/1 or larger ratio can effectively accomplish the secondary fit assuming the join part faces are near coplanar to the joining planes of mating part.

Figure 19:
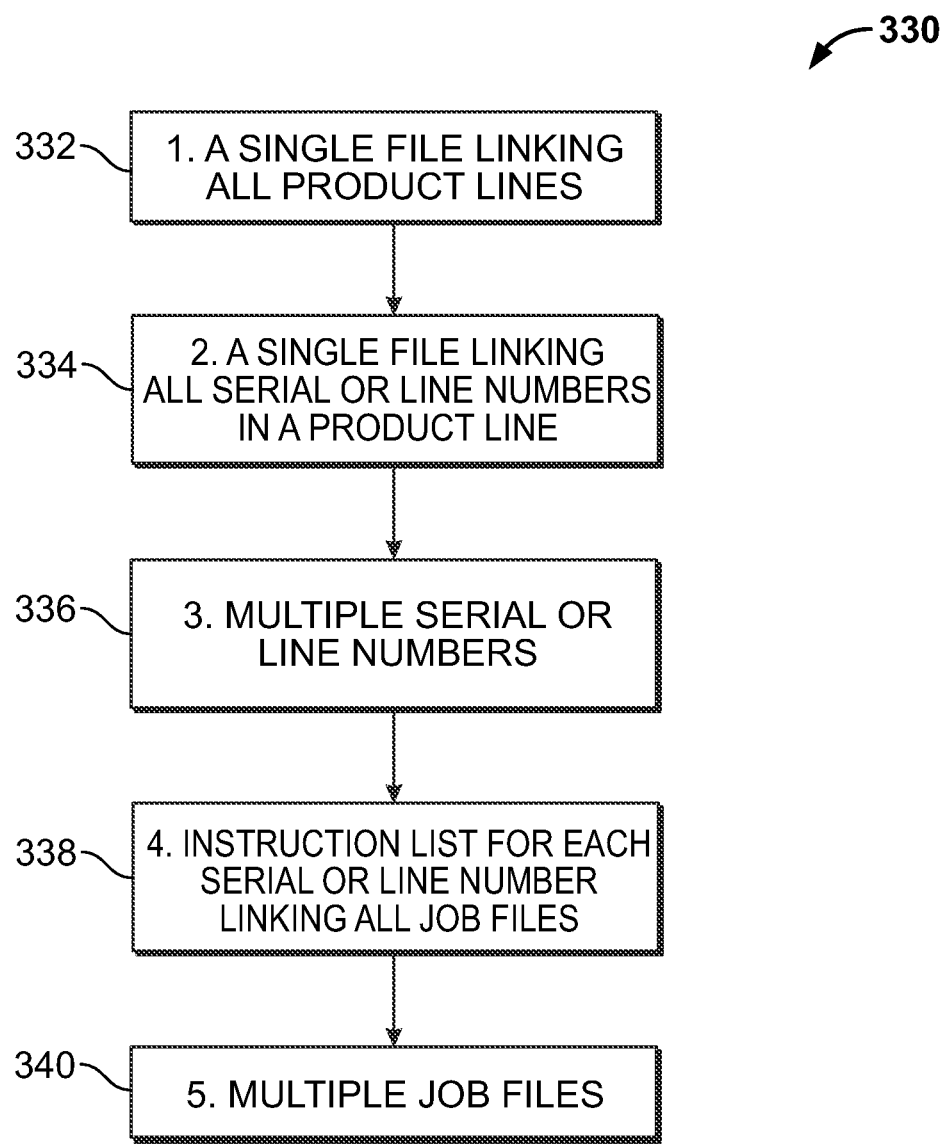
FIG. 19 is a flow diagram of an automated process in accordance with an embodiment.

Thus, an automated process may be performed for mating parts and predictive filling. In some embodiments, a logic based approach, such as shown in the method 330 of FIG. 19 may be performed. In one embodiment, each automated data processing item is contained or continues within a processing loop. In the method 330, control of the automated process is performed including:

At 332, a single file calls out all the available product lines that are being serviced by the automated code.

At 334, a single file links each product line that controls all scheduled serial numbers (line numbers) and what seed job files are allocated to each serial number or line number. For example a design change may result in a change in the job file associated with that part.

At 336, a single data folder associated with a one or more serial numbers, line numbers or projects is accessed.

At 338, a data folder is accessed that includes an instruction list file that calls out each job file that will be managed. Additionally, this file tracks each output file that is generated by each job file. The file is also used to control and track the surface fit program, errors and rework issues.

At 338, within each line number folder there is a job file for every single scan job and all the revision levels of the processed job files that are stored.

With respect now specifically to the job file, this job file in various embodiments controls all aspects of a particular job and includes the following information:

1. Data imports of unique data from a central repository file of certain unique data being scanned.
2. Records of software revisions and serial numbers of hardware used to record or process the file.
3. Links to other files: raw scan data, pictures, videos, databases or any other file useful in aiding the machine operator during machine setup or any automated process.
4. A list of tasks unique to that particular job for the complete processing of that job.
5. A definition of each alignment useful for:
   The rough alignment of the robot space to engineering space; and
   Multiple numbers of specific alignments useful in defining the structure or parts being scanned.
6. A definition of any reverse alignments of specific patterns or shapes. In this case not all of the pattern may be scanned. A reverse alignment is calculated so a particular pattern of features is aligned to the smaller subset of features that was measured.
7. A calibration certification stamp used to verify that an acceptable calibration or calibration verification was performed before the start of scanning the particular job. Additionally a record of an acceptable calibration verification is stamped after the scan to indicate the machine remained in calibration during the scan.

Figure 20:
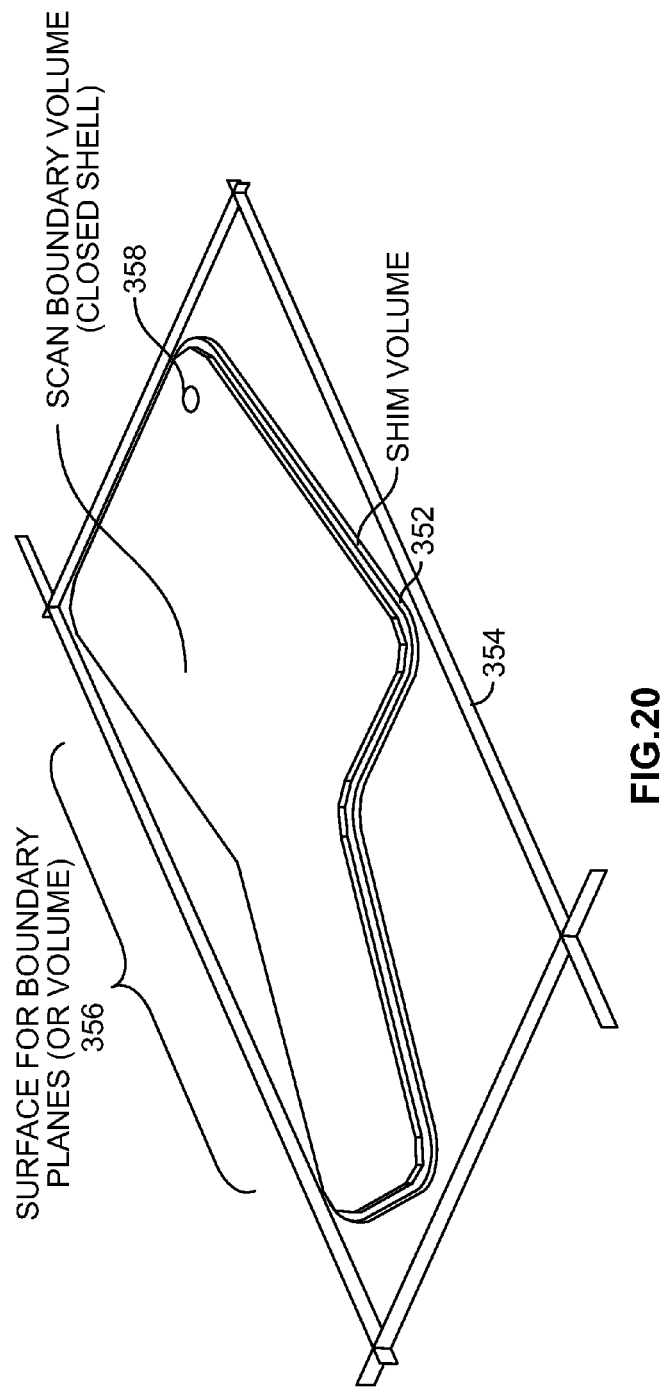
FIG. 20 is an illustration of boundaries for data processing in accordance with an embodiment.

In various embodiments, for example as shown in FIG. 20, processing of a part 350 to determine a shim volume 352 may be performed within a determined boundary. In particular, a raw data boundary 354 (e.g., an approximate boundary that is certain to include the part 350) is defined such that all raw data outside the boundary 354 is discarded. It should be noted that this discarding excludes edges, room lights and other surfaces. A surface fit boundary 356 is defined for less complicated surface fits, such as rectangular or parallelogram shaped objects. This allows the iso-parameter (Isoparm) lines to be parallel on the non-uniform rational basis spline (NURBS) surface. This boundary usually follows the exact edge of the part 350 (for convenience). The surface fit program is designed to fit up to the boundary within a tolerance. Additionally, the surface is extended an arbitrary distance beyond the boundary 356 with a lower tolerance than the fit up tolerance (e.g., 0.1 inch beyond the boundary). This allows the CAM software to have a little extra surface with which to work. Additionally, one or more hole boundaries 358 are defined wherein a boundary of data exclusion (e.g., defined as a cylindrical volume). Raw data in this volume defined by the boundaries 358 is discarded.

Figure 21:
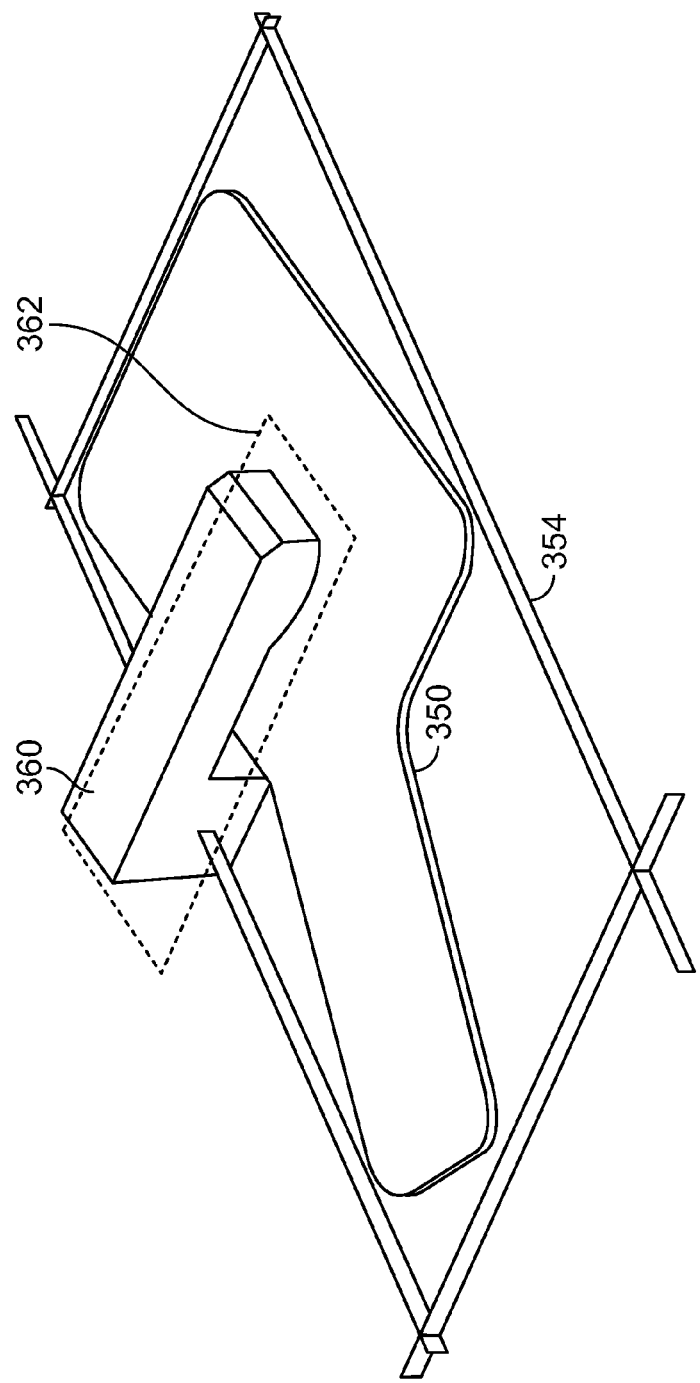
FIG. 21 is an illustration of a data mask defined in accordance with an embodiment.

It should be noted that in some applications, the part 350 is supported, for example, by a support structure, illustrated as a mechanical clamp 360 in FIG. 21. The mechanical clamp 360 is a physical obstacle to the surface data and a miscellaneous boundary 362 (e.g., a data mask) may be defined that identifies a subtraction boundary or a modified scan volume. For example, in some embodiments, the area within the miscellaneous boundary 362 is not scanned or subtracted from the data, and the surface fit program fills the void.

Figure 22:
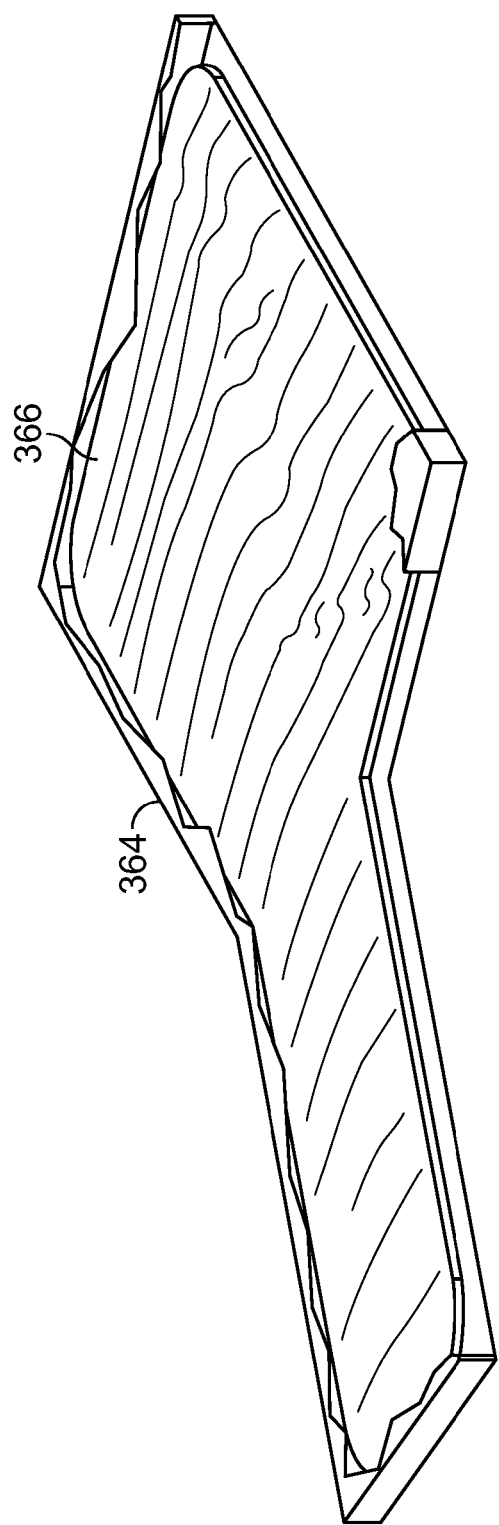
FIG. 22 is an illustration of a defined volume for data processing in accordance with an embodiment.

Thus, as shown in FIG. 22, a volume boundary 364 may be defined such that data manipulation or processing occurs only within the 3D space defined by the volume boundary 364. It should be noted that the machined surface 366 may have a contour that is also included within the 3D space defined by the volume boundary 364. Thus, the data to be processed is limited to a particular boundary. Additionally, data regarding edges, holes, and obstructions, as well as erroneous data from ceiling lights are excluded from the dataset. Thus, a bounding volume can be created for each process.

Figure 23:
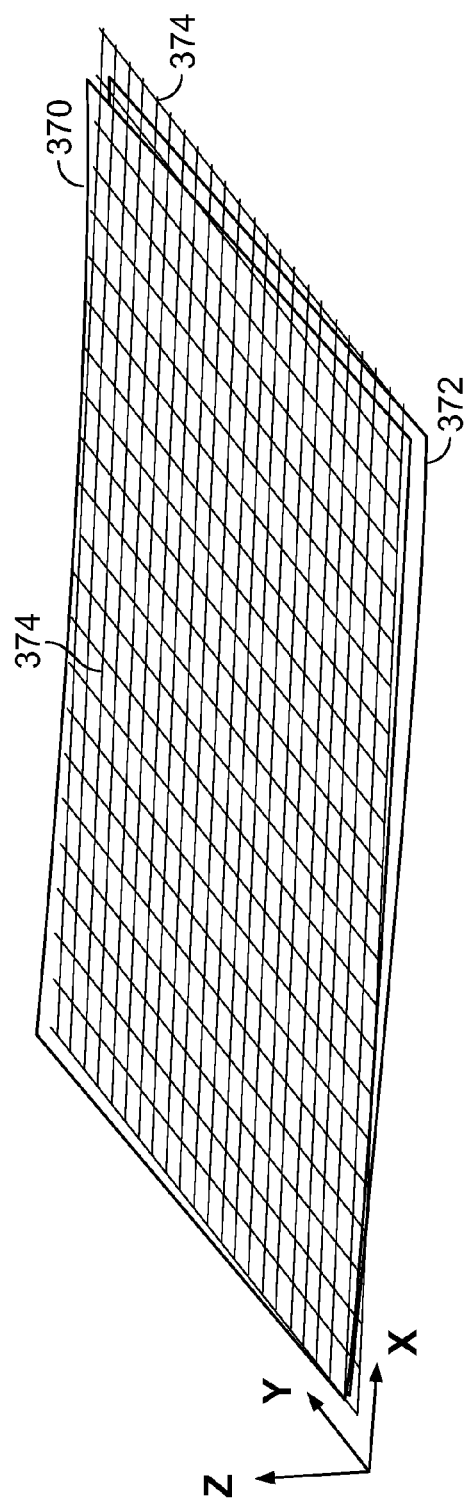
FIG. 23 is an illustration of a surface fitting in accordance with an embodiment.

In some embodiments, a machined surface 370 may mate with a non-machined surface 273. In various embodiments, a best fit elemental plane of the non-machined surface is defined with respect to the machined surface to facilitate processing as shown in FIG. 23. For example, variations from the non-machined surface 372 may be transferred to the machined surface 370 during processing. In one embodiment, a best fit plane is defined for each surface 370 and 372. A mathematical grid 374 is then created for both surfaces 370 and 372 on each plane. In some embodiments, a minimum, maximum, median or average distance is measured in each x,y grid cell which is the distance from the plane to the respective surface. The variation from each plane in each elemental cell on the non-machined surface 372 is then redistributed to the machined surface 370. In some embodiments, where the curvature of the shim is large, the curvature can be flattened by first fitting a surface through both surfaces and measuring the gap on the element by element grid. Then the gap points are projected onto a mathematical plane. In some embodiments, a best fit midpoint is used to create a surface that is then unrolled element by element in the major curvature and minor directions (U and V directions).

Figure 24:
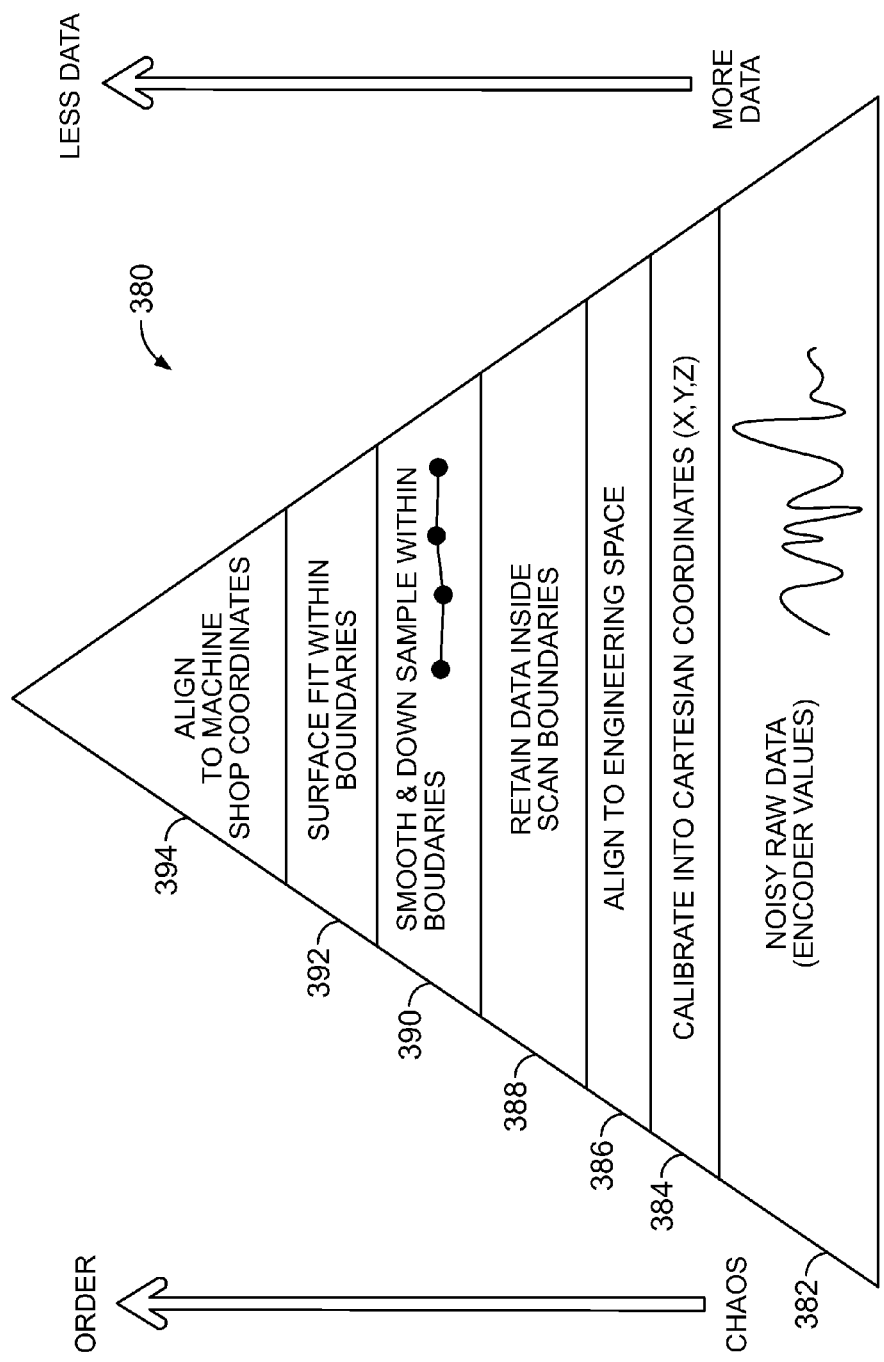
FIG. 24 is an illustration of data processing in accordance with an embodiment.

In various embodiments, data processing is performed on increasingly refined data or a smaller dataset as shown in the diagram 380 of FIG. 24 (illustrated by the arrows). In particular, raw data 382 is acquired and then calibration performed as described herein to define a calibrated dataset 384, which may be calibrated into Cartesian coordinates (x,y,z). An aligned dataset 386 is then defined by aligning the data to an engineering space. A bounded dataset 388 is the defined by retaining data within defined scan boundaries and excluding or discarding data outside of the boundaries. A smoothed dataset 390 is then formed by smoothing or down-sampling the data within the boundaries, which may be performed using different smoothing or down-sampling methods. A surface fit dataset 392 is then defined by performing a surface fit within the boundaries. A machine shop dataset 394 is then defined by aligning the data to machine shop coordinates (which may include one or more defined fillers).

Thus, a plurality of steps may be performed to pre-process the data. It should be noted that one or more of the preprocessing steps may not be performed or performed in a different order or multiple times. The process provides dataset reduction using, for example, biased criterion for signal detection in a noisy dataset and by use of volumetric boundaries, alignments, smoothing, re-sampling, and surface fitting. For example, in various embodiments, controls are added that allow for data reduction. In some embodiments, the original data may be noisy due to the instability of laser light reacting with non-uniform surface characteristics. However, certain geometry detail is to be preserved in the data reduction and smoothing process. In various embodiments, as described herein, boundary planes, control volumes, masks or subtractions may be used. Furthermore, certain useful information from the original data is retained, such as which side of the surface is the inside and which is the outside. This information may also be defined in the boundary definition so to be used in the case where data has already been converted to XYZ values.

In various embodiments, the data is transformed into the 3D space used to define the boundaries, which is referred to herein as the "engineering space". All of the boundaries in this space are defined so as to avoid flaws from "surface transition round-off", such as edges, holes, clamps on the surface or any other surface that are not part of the mating surface being scanned. The remaining data is smoothed and may be down-sampled because the smoothed data requires less data points to practically define a shape. The 3D surface fitting program creates a smooth surface that closely matches the resultant data wherein boundaries are defined to identify where the surface is to be filled. Any voids in the data from holes, clamps or edges are automatically filled up to the boundary edge. It should be noted that this fill does not need to be the same boundary as the one used for defining the edge of the allowable raw data.

In some embodiments, a further simplification is performed on any two matching surfaces that define a machinable shim (or other filler). For example, it is convenient to machine just one side of a shim and let the other side be adhered to a flat or curved machine bed. It is typical for both measured surfaces to not be flat even when one of the surfaces is designed to be flat. Furthermore some slightly curved shims can be manufactured flat and bent into the curve shape on assembly. Thus, as described herein, all the surface variations of the "machine bed" surface are mathematically transformed onto the "machinable surface".

Finally the resultant one sided shims must be put in a usable form so machining may be performed. The machinable shim (filler) is defined by the machine shop using a template for that exact shim. The local instance of that shim is transformed into the exact coordinate space of the template. Finally the surface, holes and any other useful data is packaged up into a single self-contained file that is delivered to the machine shop for automated machining process. In various embodiments, the final file is a fraction of the size of the original raw dataset.

It should be noted that in various embodiments surface transitions are subtracted before any surface smoothing is performed. For example, surface transitions may include any changes from one surface to another, such as holes, part edges, obstructions, etc.

Figure 25:
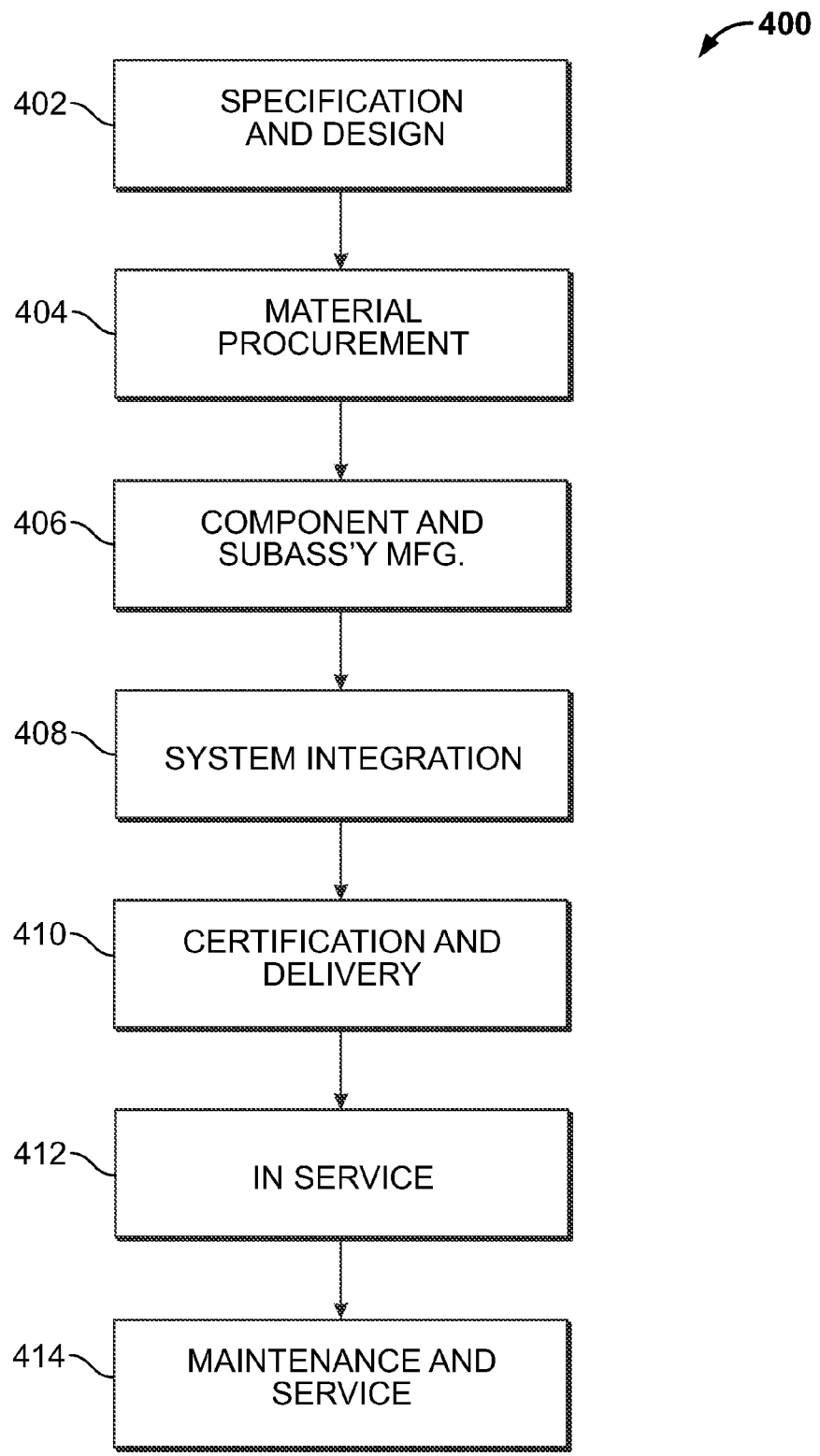
FIG. 25 is a block diagram of aircraft production and service methodology.
Figure 26:
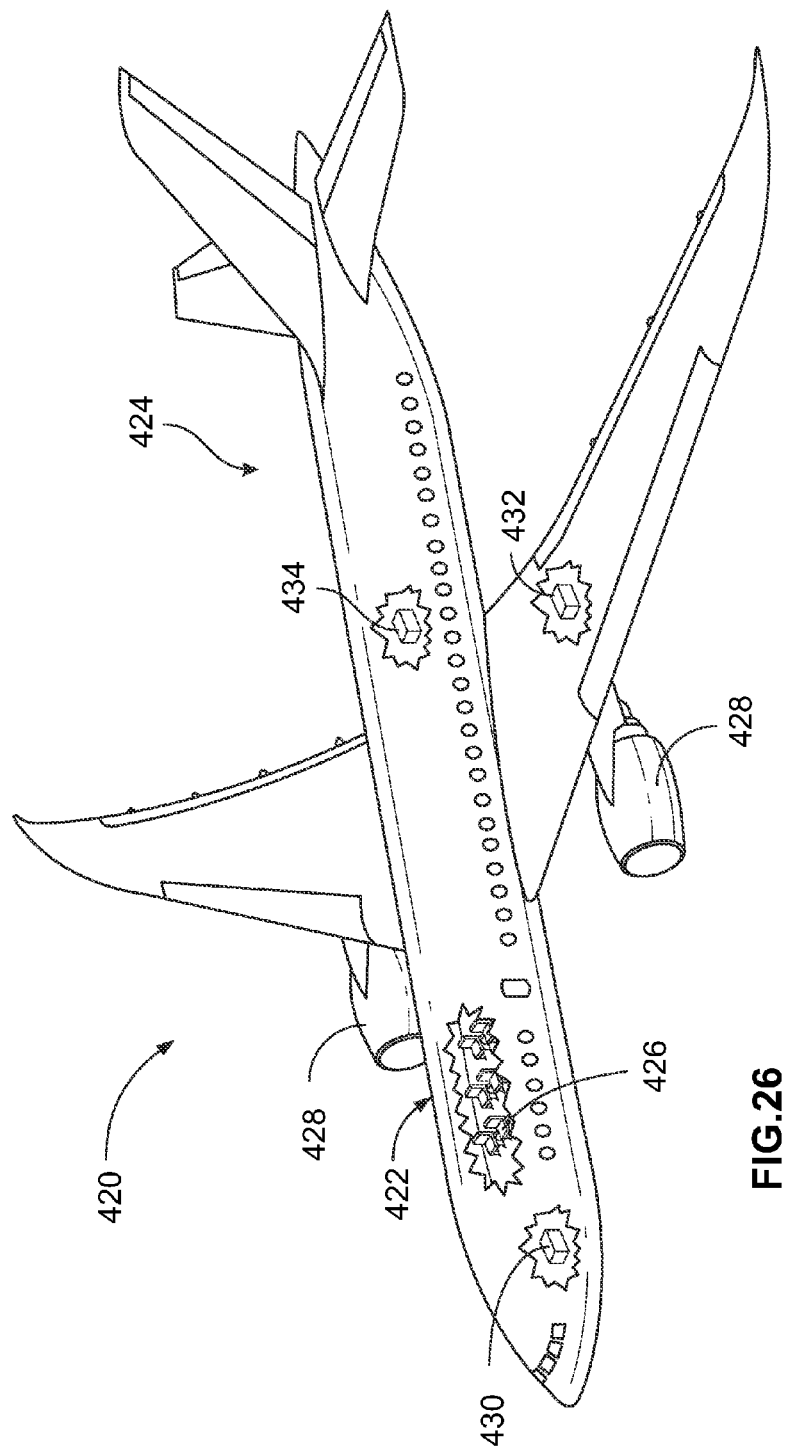
FIG. 26 is a schematic perspective view of an aircraft.

As described above, the various embodiments may be used to manufacture or design of parts in a wing or any other assembly such as an aircraft. Examples of the disclosure may be described in the context of an aircraft manufacturing and service method 400 as shown in FIG. 25 and an aircraft 420 as shown in FIG. 26. During pre-production, illustrative method 400 may include specification and design 402 of the aircraft 420 and material procurement 404. During production, component and subassembly manufacturing 406 and system integration 408 of the aircraft 420 take place. Thereafter, the aircraft 420 may go through certification and delivery 410 to be placed in service 412. While in service by a customer, the aircraft 1200 is scheduled for routine maintenance and service 414 (which may also include modification, reconfiguration, refurbishment, and so on).

Each of the processes of the illustrative method 400 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 26, the aircraft 420 produced by the illustrative method 400 may include an airframe 422 with a plurality of high-level systems 424 and an interior 426. Examples of high-level systems 424 include one or more of a propulsion system 428, an electrical system 430, a hydraulic system 432, and an environmental system 434. Any number of other systems may be included. Although an aerospace example is shown, the principles of the invention may be applied to other industries, such as the automotive industry.

Apparatus and methods shown or described herein may be employed during any one or more of the stages of the manufacturing and service method 400. For example, components or subassemblies corresponding to component and subassembly manufacturing 406 may be fabricated or manufactured in a manner similar to components or subassemblies produced while the aircraft 420 is in service. Also, one or more aspects of the apparatus, method, or combination thereof may be utilized during the production states 406 and 408, for example, by substantially expediting assembly of or reducing the cost of an aircraft 420. Similarly, one or more aspects of the apparatus or method realizations, or a combination thereof, may be utilized, for example and without limitation, while the aircraft 420 is in service, e.g., maintenance and service 414.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules, systems, or units (or aspects thereof) may be combined, a given module or unit may be divided into plural modules (or sub-modules), systems (or subsystems), or units (or sub-units), a given module, system, or unit may be added, or a given module, system, or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "system," "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof)

may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. An integrated robot measurement system comprising:
   a facility defined work zone comprising a physical area within a facility;
   first and second omni-directional ground vehicles configured to move within the facility defined work zone to a setup calibration station and an engineering defined work space, the first and second omni-directional ground vehicles each configured to support a portion of a structure thereon;
   first and second multi-axis robot removably coupled to the first and second omni-directional ground vehicles, respectively, and configured to move first and second laser scanners, respectively, when the first and second laser scanners are positioned at the setup calibration station or the engineering defined work space, the first and second laser scanners of the first and second multi-axis robots configured to move in at least two linear directions and one rotational direction; and
   a processor configured to automatically generate a surface ready output file from measurement data received from the first and second laser scanners to define coordinate systems for the movement of the first and second omni-directional ground vehicles to move into position for joining the portions of the structures, the surface ready output file defining one or more of a surface, hole or feature.

2. The robot measurement system of claim 1, wherein the first multi-axis robot is configured to move a measurement sensor of the first multi-axis robot into a part to be measured.

3. The robot measurement system of claim 2, wherein the part comprises an aircraft assembly part.

4. The robot measurement system of claim 1, wherein the first multi-axis robot comprises a horizontal support configured to allow movement a distance along an x-axis and a secondary support coupled to the horizontal support configured to allow movement an additional distance along the x-axis.

5. The robot measurement system of claim 1, wherein the second multi-axis robot comprises a table base configured to allow movement along an x-axis, a horizontal support movably coupled to the table base and configured to allow movement along a y-axis, and a vertical support to allow movement along a z-axis.

6. The robot measurement system of claim 1, wherein the first and second multi-axis robots each further comprise at least one safety laser coupled to a base of the first and second multi-axis robots, wherein a controller uses data received from the safety lasers to control movement of the first and second multi-axis robots.

7. The robot measurement system of claim 1, wherein at least one of the first and second omni-directional ground vehicles comprises at least one cart lift axis.

8. The robot measurement system of claim 1, wherein a measurement sensor of one or both of the first and second multi-axis robots comprises a laser displacement sensor.

9. The robot measurement system of claim 1, wherein the first multi-axis robot comprises a base having a robotic jack system.

10. The robot measurement system of claim 1, wherein the first and second multi-axis robots comprise a laser scanner having a measurement sensor, the first omni-directional ground vehicle removably coupled to the laser scanner.

11. The robot measurement system of claim 1, wherein the first and second multi-axis robots are configured to measure an aircraft part using measurement sensors.

12. The robot measurement system of claim 1, wherein one of the first and second multi-axis robots comprises the processor.

13. The robot measurement system of claim 1, wherein one or both of the first and second omni-directional ground vehicles is programmable to move only within a boundary of the facility defined work zone and an individual is restricted from entry to the engineering defined work space.

14. The robot measurement system of claim 1, wherein the setup calibration station comprises a template with exposed calibration openings and at least one of the first or second multi-axis robots are configured to be automatically calibrated before moving to the engineering defined work space and performing measurements on the part using the measurement sensor, wherein the exposed calibration openings define a coordinate space used for calibration.

15. The robot measurement system of claim 14, wherein at least one of the first or second multi-axis robots is configured to be automatically calibrated after performing the measurements.

16. The robot measurement system of claim 1, wherein the first and second omni-directional ground vehicles and measurement sensors are configured for remote control by a controller.

17. The integrated robot measurement system of claim 1, wherein the portions of the structures comprise two aircraft stabilizer halves.

18. The integrated robot measurement system of claim 1, further comprising a simulator configured to predict motion of the one or more omni-directional ground vehicles for calibration, surface scanning, locating features, or alignment of the portions of the structure.

19. The integrated robot measurement system of claim 1, wherein the processor is configured to provide feedback to position the portions of the structure during one of fabrication or assembly.

20. The integrated robot measurement system of claim 1, wherein the processor is configured to provide feedback to manipulate the portions of the structure during one of fabrication or assembly, wherein the manipulation includes morphing a shape of at least one of the portions of the structure.

* * * * *